(12) United States Patent
Yamada

(10) Patent No.: US 7,237,911 B2
(45) Date of Patent: Jul. 3, 2007

(54) IMAGE CORRECTION METHOD FOR MULTI-PROJECTION SYSTEM

(75) Inventor: Yoshihito Yamada, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 328 days.

(21) Appl. No.: 11/082,089

(22) Filed: Mar. 17, 2005

(65) Prior Publication Data
US 2005/0206857 A1 Sep. 22, 2005

(30) Foreign Application Priority Data
Mar. 22, 2004 (JP) ............................. 2004-082715

(51) Int. Cl.
- G03B 21/00 (2006.01)
- G03B 21/14 (2006.01)
- G03B 21/26 (2006.01)
- H04N 5/66 (2006.01)
- H04N 3/22 (2006.01)

(52) U.S. Cl. .................... 353/121; 353/30; 353/69; 353/70; 353/94; 348/383; 348/745

(58) Field of Classification Search ............... 353/30, 353/69, 70, 94, 121; 348/383, 745; 345/42
See application file for complete search history.

(56) References Cited

U.S. PATENT DOCUMENTS 6,456,339 B1 * 9/2002 Surati et al. ................ 348/745
6,480,175 B1 * 11/2002 Schneider ................... 345/32
6,824,271 B2 * 11/2004 Ishii et al. ................... 353/31
2002/0024640 A1 * 2/2002 Ioka ............................ 353/94

FOREIGN PATENT DOCUMENTS

| JP | A 09-326981 | 12/1997 |
|---|---|---|
| JP | A 2002-072359 | 3/2002 |
| JP | A 2003-046751 | 2/2003 |
| JP | A 2003-219324 | 7/2003 |
| JP | A 2004-015204 | 1/2004 |
| JP | A 2004-015205 | 1/2004 |

* cited by examiner

Primary Examiner—Melissa Jan Koval
(74) Attorney, Agent, or Firm—Oliff & Berridge, PLC

(57) ABSTRACT

Embodiments provide geometric consistency in overlapping areas when a tiling projection is performed where adjacent projection images have overlapping areas using a plurality of projectors. Embodiments provide a method in which a geometric correction function is formed on the basis of geometric association between positions, in display areas of projectors PJa to PJd, of features included in pattern images projected from the projectors and positions, in projection areas of the projectors, of features included in pattern-photographed images obtained by photographing the pattern images projected onto a projection plane from the projectors and in which the projection images projected from the plurality of projectors are corrected to have geometric consistency on the projection plane using the geometric correction function. The densities of feature points in specific areas of the display or projection areas of the projectors are set higher than those of areas other than the overlapping areas.

13 Claims, 23 Drawing Sheets

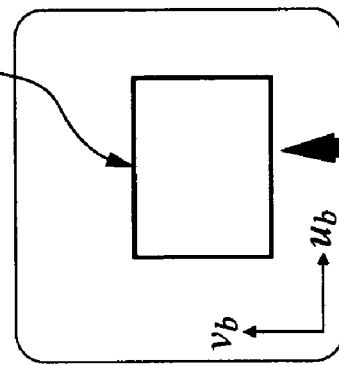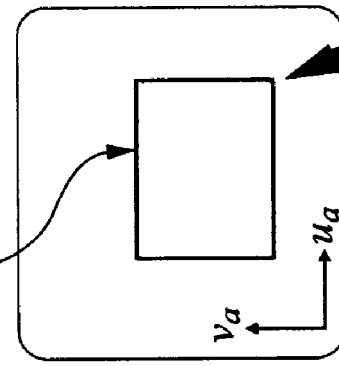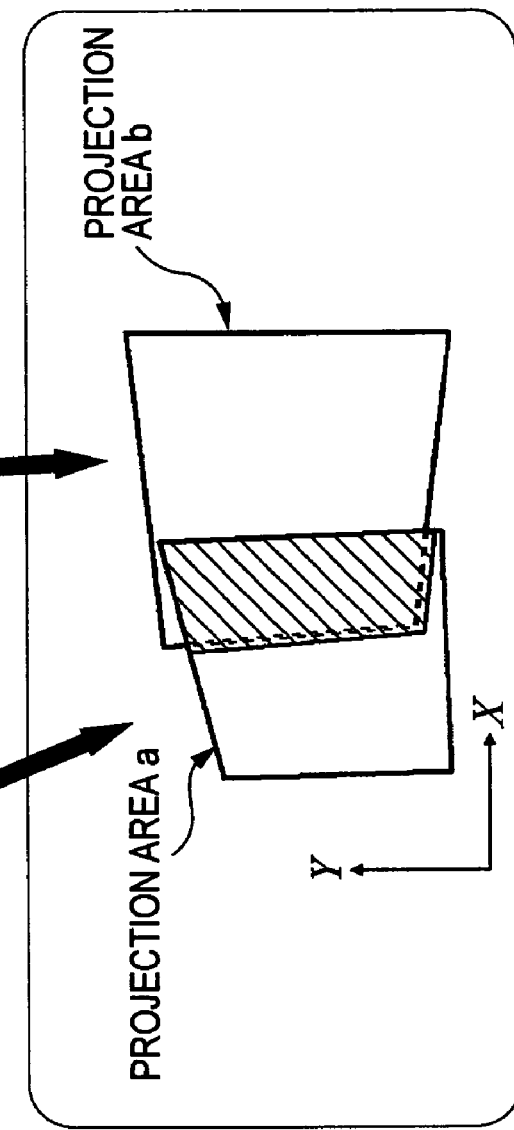
FIG. 1A
FIG. 1B

FIG. 12A
FIG. 12B
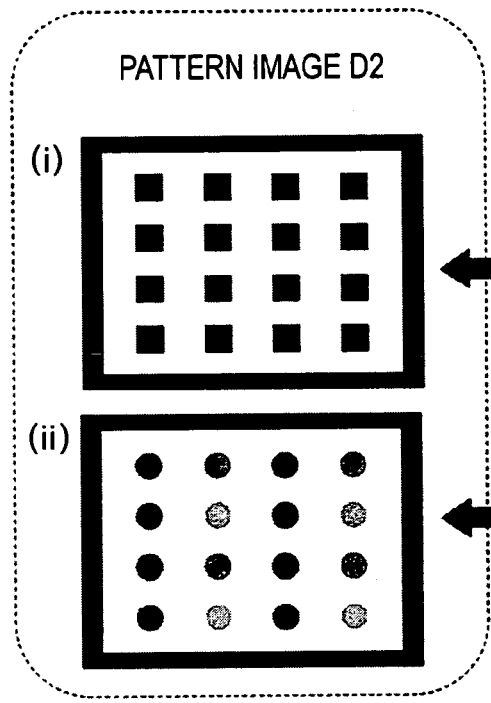
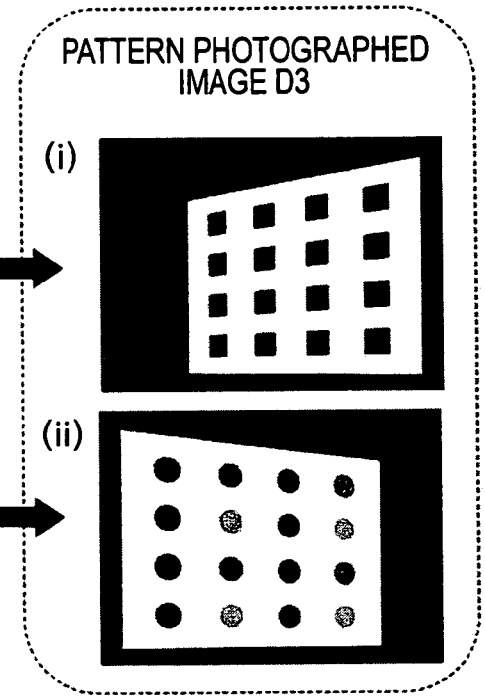
FIG. 13
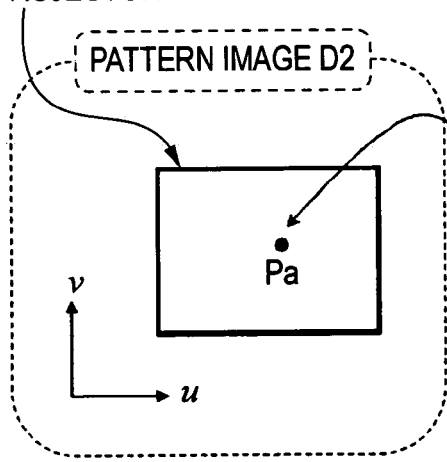
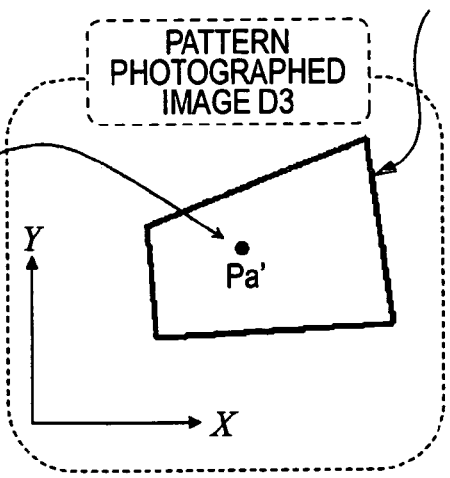

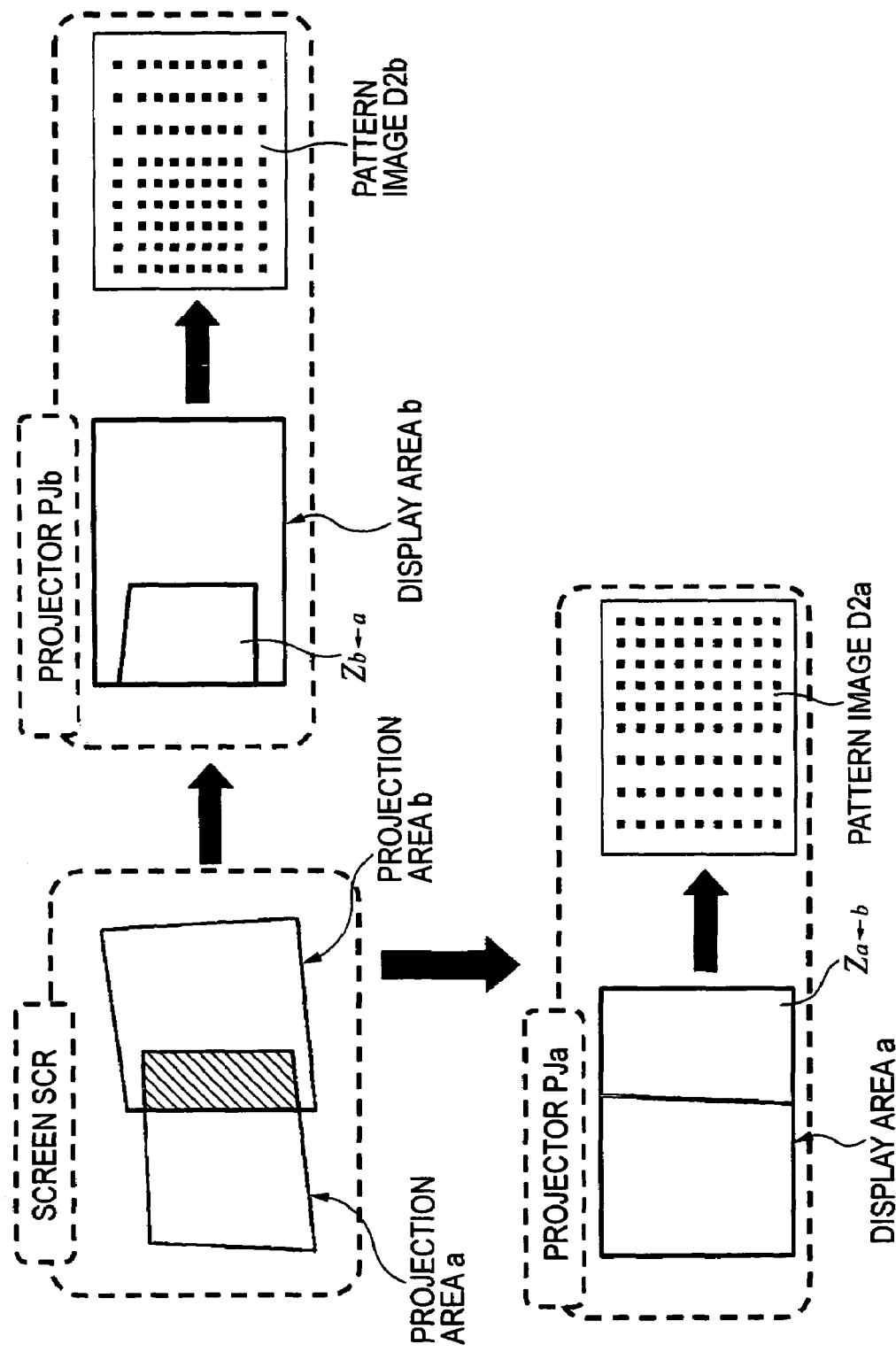

RIGHT SIDE IS
MORE DENSED

LEFT SIDE IS
MORE DENSED

BOTH OF LEFT AND RIGHT
SIDES ARE MORE DENSED

LOWER SIDE IS
MORE DENSED

UPPER SIDE IS
MORE DENSED

BOTH OF UPPER AND LOWER
SIDES ARE MORE DENSED

IMAGE CORRECTION METHOD FOR MULTI-PROJECTION SYSTEM

BACKGROUND

Exemplary embodiments of the present invention relate to an image correction method for a multi-projection system, an image correcting device for a multi-projection system, and a multi-projection system.

The related art includes multi-projection systems which can display one large-screen image by arranging a plurality of optical projection units (hereinafter, referred to as projectors) in the horizontal or vertical direction, or in the horizontal and vertical directions, respectively, and performing tiling projection of projection images onto a screen from the plurality of projectors. The tiling projection means a projection method allowing one large-size image to be displayed by arranging the projection areas of the plurality of projectors on the screen in a tile shape.

Since such multi-projection systems can display images with high definition and high brightness, it is expected that the multi-projection systems should be widely spread in the business field of movie theaters, art galleries, museums, seminar meeting places, meeting places, mini theaters, public institutions, business enterprises, etc. or in the household field of amusements, home theaters, etc.

In such multi-projection systems, it is necessary to project images (hereinafter, referred to as unit images) such that the unit images projected from a plurality of projectors should not be geometrically inconsistent. As a result, the related art includes a variety of techniques for providing consistency between the unit images projected from the plurality of projectors.

In the multi-projection systems of the related art, a technique of displaying projection images from adjacent projectors so as to have an area where parts thereof are overlapped on a screen (hereinafter, referred to as an overlapping area) has been put into practice.

In the related art, when the projection images are displayed on the screen so as to have the overlapping area, a geometric correction function between a display area in the respective projectors of image data projected from the respective projectors and a projection area of the respective projectors on the screen is calculated. Further, geometrically-corrected image data to be properly projected onto the screen are generated from the geometric correction function and the image data, and the geometrically-corrected image data are projected from the respective projectors.

At this time, insufficient accuracy of the geometric correction function in the overlapping areas among the projectors can generate defocused images in the overlapping areas, thereby largely damaging quality of the projection images in the multi-projection systems.

As described above, the related art includes a variety of techniques for improvement image quality in the overlapping areas when the projection images from adjacent projectors are displayed to have the areas where parts of the projection images are overlapped on the screen (hereinafter, referred to as overlapping areas). Examples thereof are disclosed in Related Art Documents Japanese Unexamined Patent Application Publication No. 9-326981, Japanese Unexamined Patent Application Publication No. 2002-72359 and Japanese Unexamined Patent Application Publication No. 2003-219324.

In Related Art Document Japanese Unexamined Patent Application Publication No. 9-326981, pattern images are projected onto a screen from a plurality of projectors, the pattern images projected onto the screen are photographed with a camera, and projection positions of the projectors are calculated on the basis of the pattern images obtained by photographing the original pattern images.

In Related Art Document Japanese Unexamined Patent Application Publication No. 2002-72359, pattern images are projected onto a screen from a plurality of projectors, the pattern images projected onto the screen are photographed with a camera, and a geometric deformation function between the projection images projected from the projectors and the projection areas on the screen is calculated on the basis of the pattern image obtained by photographing the original pattern images. In Related Art Japanese Document Unexamined Patent Application Publication No. 2002-72359, a method of dividing a projection area from a single projector into small areas and calculating a geometric variable function for each small area is disclosed.

In Related Art Document Japanese Unexamined Patent Application Publication No. 2003-219324, calibration pattern images are projected onto a screen from a plurality of projectors, the calibration pattern images projected onto the screen are photographed with a camera, and image correction data of the images to be projected from the respective projectors are calculated on the basis of the calibration pattern images obtained by photographing the calibration pattern images. The calibration pattern images disclosed in Related Art Document Japanese Unexamined Patent Application Publication No. 2003-219324 have markers or gradations and the image correction data are calculated using the center of gravity obtained from the brightness values of the markers or gradations.

SUMMARY

In Related Art Document Japanese Unexamined Patent Application Publication No. 9-326981 described above, in processing the overlapping areas, only the brightness adjusting process considering that the brightness of the overlapping areas is higher than that of areas except for the overlapping areas, and the above-mentioned geometric correction, is not performed in the overlapping areas. In Related Art Document Japanese Unexamined Patent Application Publication No. 9-326981, since the geometric correction is not performed in the overlapping areas but only the brightness adjusting process is performed, it is difficult to obtain the geometric consistency in the overlapping areas, so that it is not possible to address or solve the defocus of images in the overlapping areas.

In Related Art Japanese Document Unexamined Patent Application Publication No. 2002-72359, the geometric variable function is calculated by dividing the projection area of a projector into small areas. As a result, a large amount of calculation is required for calculating the geometric correction function, thereby increasing the processing time. In addition, in Related Art Document Japanese Unexamined Patent Application Publication No. 2002-72359, it is not disclosed how the projection area of a projector on a screen is divided into small areas. As a result, in order to obtain proper accuracy of the geometric variable function, it cannot be known to what degree the projection area should be divided. Therefore, in Related Art Document Japanese Unexamined Patent Application Publication No. 2002-72359, it is difficult to obtain a proper geometric variable function with a small amount of calculation.

In Related Art Document Japanese Unexamined Patent Application Publication No. 2003-219324, since the markers or gradations as the calibration pattern images disclosed therein do not pay attention to a specific area such as an overlapping area, it is not possible to solve the defocus of images in the overlapping areas.

Exemplary embodiments of the present invention provide an image correction method for a multi-projection system, an image correcting device for a multi-projection system, and a multi-projection system, which can display a large-sized image with high quality by improving accuracy of a geometric correction function in an overlapping area of a projection area of each of a plurality of projectors constructing the multi-projection system.

(1) According to an exemplary aspect of the present invention, there is provided an image correction method for a multi-projection system in which geometric association is performed between positions, in display areas of a plurality of projectors, of features included in pattern images projected from the plurality of projectors and positions, in projection areas of the plurality of projectors, of features included in pattern-photographed images obtained by photographing the pattern images projected onto a projection plane from the plurality of projectors, a geometric correction function is formed on the basis of the geometric association, and projection images projected from the plurality of projectors are corrected using the formed geometric correction function to have geometric consistency on the projection plane. The density distribution of features of the pattern images is set such that the density of features in a specific area of the display area or projection area of each projector is higher than that in an area except for the specific area in at least one of the plurality of projectors.

As a result, since the densities of features in the specific areas of the display areas or projection areas of the projectors are set to be higher than those in areas except for the specific areas in at least one projector among the plurality of projectors, it is possible to allow the geometric correction function in the specific area to have high accuracy by preparing the geometric correction function on the basis of the pattern images and the pattern-photographed images obtained by photographing the pattern images.

As a result, for example, when the specific area is an overlapping area where a plurality of projection areas overlap each other, it is possible to perform the geometric correction with higher accuracy in the overlapping areas in which it is difficult to obtain the geometric consistency, by performing the image correction using the geometric correction function.

The display area of a projector in exemplary embodiments of the present invention means a display area in a coordinate system of the projector, and the projection area of a projector on the projection plane means a projection area in a coordinate system of the projection plane (screen).

(2) In the image correction method for a multi-projection system according to (1), the density of features may be expressed by the number of features per unit area in the specific area.

As a result, (1) can be easily embodied, and it is possible to allow the geometric correction function to have high accuracy in the specific area.

(3) In the image correction method for a multi-projection system according to (1) or (2), the specific area may be an overlapping area where the projection area of each projector overlaps the projection areas of other projectors.

As a result, it is possible to effectively construct a tiling display in which adjacent projection areas are displayed to partially overlap each other. That is, according to exemplary embodiments of the present invention, since the geometric consistency in the overlapping area can be obtained with high accuracy, it is possible to reduce or prevent the defocus of images which easily occurs in the overlapping area.

(4) In the image correction method for a multi-projection system according to (1) or (2), the specific area may be a boundary area including an edge portion for each projector.

This means that the specific area in which the density of feature points is increased is not limited to the overlapping area and that it is possible to increase the density of feature points at an edge portion of the projection area of a projector. As a result, for example, when a single projector is used or when a multi-projection system is constructed using a plurality of projectors without forming any overlapping area, proper geometric correction can be performed at the edge portion of the projection area of a projector, thereby obtaining a projection image with high quality.

(5) In the image correction method for a multi-projection system according to (3), noting a projector among the plurality of projectors, the density of features in the overlapping area may be set to be higher with an increase in the number of overlapping areas where the projection areas of other projectors overlap the projection area of the noted projector.

Here, it is considered that it is difficult to obtain the geometric consistency with an increase in the number of overlapping areas at any position in the projection area of the noted projector. As a result, by increasing the density of features with an increase in the number of overlapping areas in the projection area of each projector on the projection plane, it is possible to obtain the geometric consistency in the overlapping area with higher accuracy.

(6) In the image correction method for a multi-projection system according to any one of (1) to (5), it is preferable that the geometric association is performed between positions, in the display areas of the plurality of projectors, of features included in the pattern images projected from the plurality of projectors and positions, in the projection areas of the plurality of projectors, of features included in the pattern-photographed images obtained by photographing the pattern images projected onto the projection plane from the plurality of projectors, the geometric correction function formed on the basis of the geometric association is estimated, the pattern images are updated by varying the density distribution of features when it is determined that the result of the estimation is not reasonable, and the geometric correction function is formed on the basis of the updated pattern images.

In this case, when a reasonable result is not obtained as a result of estimating the geometric correction function, the density of features is changed. As a result, there is an increased possibility of obtaining a geometric correction function with higher accuracy. Further, it is possible to obtain an optimum geometric correction function by repeating the change of density several times depending upon situations.

(7) In the image correction method for a multi-projection system according to (6), the variation in density distribution of the features may be performed by increasing the density of features in each specific area by changing the positions of the features included in the pattern images.

As a result, it is possible to simply and securely increase the density of features in the specific area, thereby easily embodying (6).

(8) In the image correction method for a multi-projection system according to (6) or (7), the variation in density distribution of the features may be performed by more increasing the density of features in each specific area by adding or removing the features included in the pattern images.

As a result, it is also possible to simply and securely increase the density of features in the specific area, thereby easily embodying (6).

(9) In the image correction method for a multi-projection system according to any one of (6) to (8), the variation in density distribution of the features may be performed in the display areas of the projectors or the projection areas of the projectors on the projection plane.

This means that the variation in density distribution of the features can be performed in the display areas of the projectors and can be also performed in the projection areas of the projectors on the projection plane. In this way, when the density distribution of the features is varied in any one of the display area of each projector and the projection area of each projector, it is possible to obtain the advantage according to (1).

(10) In the image correction method for a multi-projection system according to any one of (1) to (9), the geometric correction function may be formed on the basis of the sum of residuals calculated using the geometric association and the geometric correction function between the positions, in the display areas of the plurality of projectors, of features included in the pattern images and the positions, in the projection areas of the plurality of projectors, of features included in the projection areas on the projection plane of the plurality of projectors when the pattern images are projected onto the projection plane.

This means that the geometric correction function is formed, for example, using a least square method. Accordingly, it is possible to properly obtain the geometric correction function. In this case, the geometric correction function is generally obtained so as to make the sum of residuals the minimum, but there may be no problems when the sum of residuals may not be the minimum but a value close to the minimum.

(11) In the image correction method for a multi-projection system according to any one of (1) to (10), the features included in the pattern images may be provided such that images having the features are scattered at points, edges, and corners on the display areas of the projectors.

In this way, by displaying the features included in the pattern images as points (for example, circular black points, rectangular black points, etc.), edges, and corners, it is possible to securely perform the association between the pattern images and the pattern-photographed images with a small number of calculations and it is also possible to easily generate the pattern images. The color of the features is not particularly limited.

(12) According to another exemplary aspect of the present invention, there is provided an image correcting device for a multi-projection system in which geometric association is performed between positions, in display areas of a plurality of projectors, of features included in pattern images projected from the plurality of projectors and positions, in projection areas of the plurality of projectors, of features included in pattern-photographed images obtained by photographing the pattern images projected onto a projection plane from the plurality of projectors, a geometric correction function is formed on the basis of the geometric association, and projection images projected from the plurality of projectors are corrected using the formed geometric correction function to have geometric consistency on the projection plane. The image correcting device includes a pattern image generating device to set the density distribution of features of the pattern images such that the density of the features in a specific area of the display area or projection area of each projector is higher than that in an area except for the specific area in at least one of the plurality of projectors.

In the image correcting device for a multi-projection system, it is possible to obtain the same advantages as the image correction method for a multi-projection system according to (1). The image correcting device for a multi-projection system according to (12) may have the same features as the image correction method for a multi-projection system according to (2) to (11).

(13) According to another exemplary aspect of the present invention, there is provided a multi-projection system having an image correcting device capable of correcting projection images from a plurality of projectors so as to have geometric consistency on a projection plane when the projection images projected from the plurality of projectors are displayed such that parts of the projection images are overlapped with each other, the image correcting device being the image correcting device for a multi-projection system according to (12).

According to the multi-projection system, since the geometric consistency in the overlapping areas among the projection images from the plurality of projectors can be obtained with high accuracy, it is possible to perform a tiling projection with high quality in which the defocus in the overlapping area is reduced or prevented.

BRIEF DESCRIPTION OF THE DRAWINGS

FIGS. 1A-B are schematics showing a display area in a projector and a projection area of the projector on a screen for the purpose of explaining an image correction method for a multi-projection system according to an exemplary embodiment of the present invention;

FIGS. 12A-B are schematics showing an example of a pattern image used in an exemplary embodiment;

FIG. 13 is a schematic showing an association between a point Pa in a pattern image of a projector and a point Pa' in a pattern-photographed image of the projector;

FIG. 16 is a schematic showing a first feature-point defining method which is performed by the pattern image generator shown in FIG. 8;

DETAILED DESCRIPTION OF EMBODIMENTS

Figure 2:
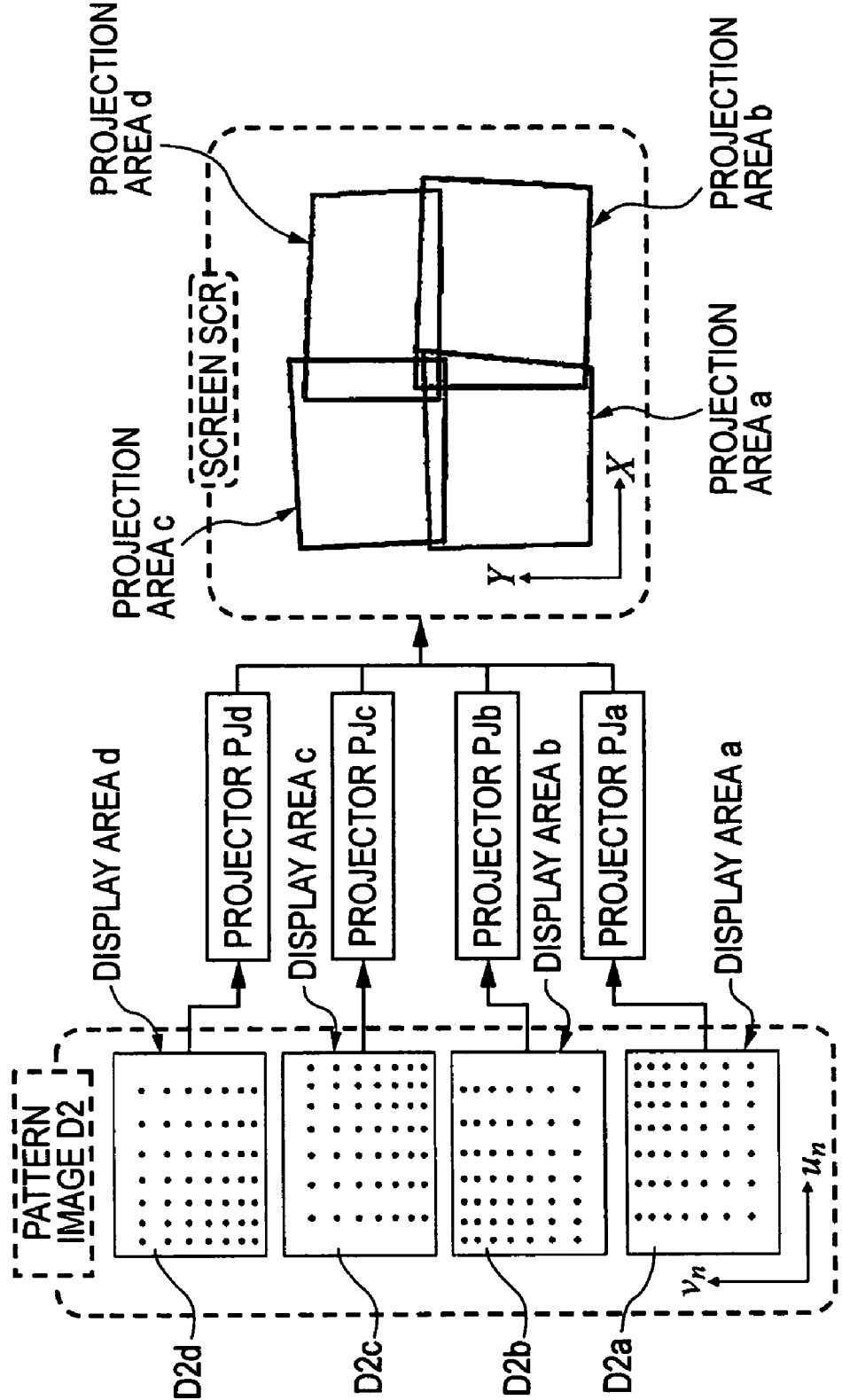
FIG. 2 is a schematic showing an example of setting the density distribution of feature points of a pattern image according to an exemplary embodiment of the present invention.

An image correction method for a multi-projection system according to exemplary embodiments of the present invention will be now described. The image correction method for a multi-projection system according to exemplary embodiments of the present invention is an image correction method for preparing a geometric correction function on the basis of pattern images projected from a plurality of projectors and pattern-photographed images obtained by photographing the pattern images projected onto a projection plane from the plurality of projectors and correcting the projection images to be projected from the plurality of projectors using the formed geometric correction function to obtain geometric consistency on the projection plane.

The geometric correction function is calculated on the basis of the sum of residuals calculated using the geometric association and the geometric correction function between positions in the display areas of the projectors of features included in the pattern images and positions in projection areas of the projectors of features included in the projection areas of the projectors on the projection plane when the pattern images are projected onto the projection plane.

In an exemplary embodiment of the present invention, in order to allow the above-mentioned geometric correction function to be a function capable of performing accurate geometric correction in a specific area, the density distribution of features included in the pattern image has been studied. Specifically, the density distribution is set such that the density of features of the pattern image is increased in a specific area in the display area or projection area of each projector.

Here, the display area of a projector means a display area of the projector(a coordinate system in each projector) and the projection area of a projector means a projection area of the projector projected onto a screen (a coordinate system on the screen). For example, as shown in FIG. 1A, two projectors (referred to as PJa and PJb, respectively) are assumed. When a display area a in a $u_a$-$v_a$ coordinate system of the projector PJa and a display area b in a $u_b$-$v_b$ coordinate system of the projector PJb are projected onto the screen, it is assumed that projection areas a and b of the projectors PJa and PJb in an X-Y coordinate system on the screen are shown in FIG. 1B.

Coordinate conversion expressions (geometric correction functions) indicating geometric conversion between the display areas of the projectors PJa and PJb and the projection areas of the projectors PJa and PJb can be given as follows.

$$u_n = f_n(X, Y) \quad (1)$$

$$v_n = g_n(X, Y) \quad (2)$$

In Expressions (1) and (2), $(u_n, v_n)$ denotes coordinates of the display area of the projectors and $(X, Y)$ denotes coordinates of the projection areas on the screen. Here, n denotes a projector number, and in FIG. 1, since two projectors PJa and PJb are provided, n=a, b.

In order to obtain Formulas (1) and (2), the geometric correction function used in the present exemplary embodiment is calculated such that the total sum of residuals calculated using a geometric association and a geometric correction function between positional coordinates of plural features existing in the display area of each projector and positional coordinates of plural features existing in the projection area of each projector, becomes the minimum. That is, the geometric correction function is determined using a least square method given by Expression (3) described below. Although there may be no problem even when the total sum of residuals is not "the minimum" but a value close thereto, it is assumed in the present exemplary embodiment that the total sum of residuals is the minimum.

[Formula 3] \quad (3)

$$\begin{cases} \sum_i [f_n(X_i, Y_i) - u_{ni}]^2 = 0 \\ \sum_i [g_n(X_i, Y_i) - v_{ni}]^2 = 0 \end{cases}$$

In Formula 3, i denotes the feature point number, $(u_{ni}, v_{ni})$ denotes coordinates of the display area in a projector with respect to the i-th feature point, $(X_i, Y_i)$ denotes coordinates of the projection area of a projector on the screen with respect to the i-th feature point. $(u_{ni}, v_{ni})$ and $(X_i, Y_i)$ make a geometric association.

In the exemplary embodiment of the present invention, as described above, the density distribution of the features included in the pattern image is increased in a specific area in the display area or projection area in each projector. In the present exemplary embodiment, the features included in the pattern image is provided such that images having the features are scattered at points, edges, and corners on the display area of the projector. A specific example of the pattern image will be described later.

Figure 7:
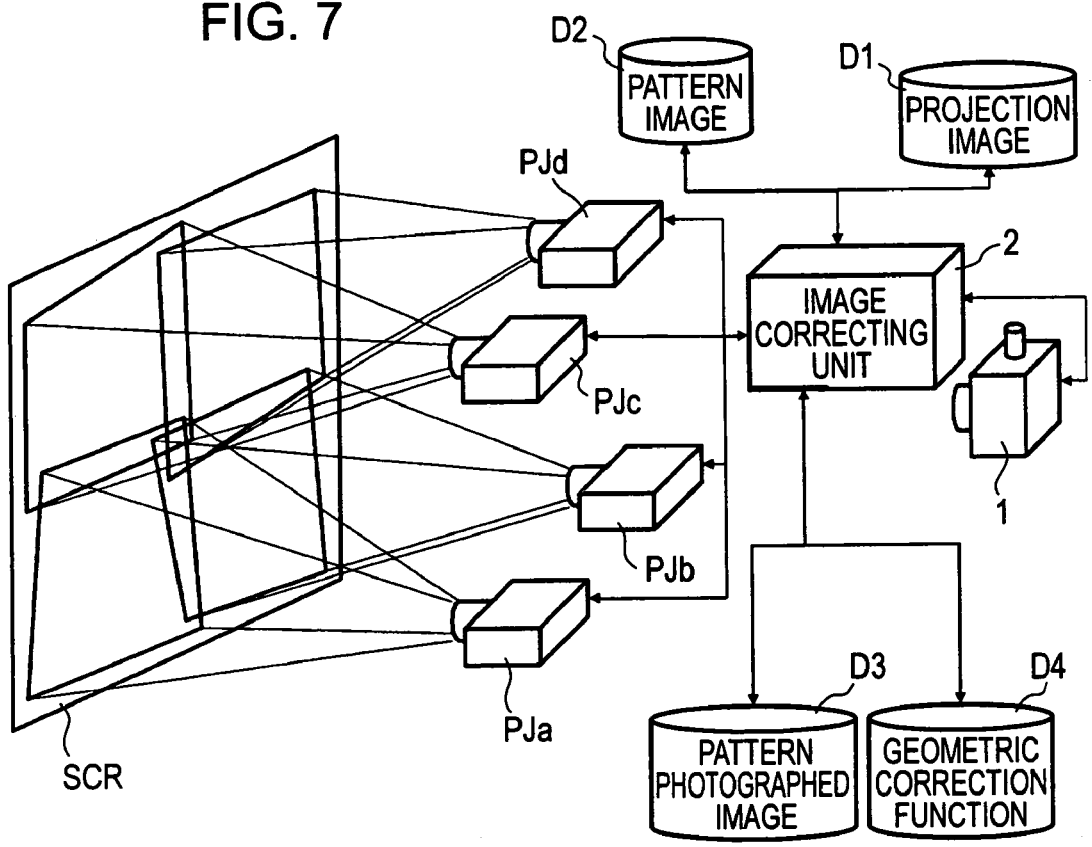
FIG. 7 is a schematic showing a structure of a multi-projection system according to an exemplary embodiment of the present invention.

Hereinafter, a method of defining feature points such that the density of features (referred to as feature points in the present exemplary embodiment) in the pattern image is increased in a specific area of the display area or projection area of each projector will be described. Here, as shown in FIG. 7 described later, an example where total four projectors PJa to PJd (2×2) are arranged by two projectors in a vertical direction and by two projectors in a horizontal direction and the projection images projected from the projectors PJa to PJd are projected in a tiling type such that parts of adjacent projection images are overlapped with each other on a screen SCR will be described. Therefore, in the present exemplary embodiment, the specific area is an overlapping area where parts of the adjacent projection images are overlapped with each other.

First, a basic method of defining feature points according to an exemplary embodiment of the present invention will be described. In the basic method of defining feature points according to the exemplary embodiment of the present invention, as shown in FIG. 2, the density of feature points of pattern image data (denoted by D2 and referred to as pattern image D2) is set high in the overlapping areas where the projection areas a, b, c, and d of four projectors PJa to PJd on the screen SCR overlap the projections areas of other projectors. Hereinafter, individual pattern images corresponding to four projectors PJa to PJd are denoted by D2a, D2b, D2c, and D2d, and when the pattern images are collectively referred to as the pattern image, they are denoted by a pattern image D2.

As can be seen from FIG. 2, the projection area a of the projector PJa, the projection area b of the projector PJb, the projection area c of the projector PJc, and the projection area d of the projector PJd have the overlapping areas with the adjacent projection areas, and the pattern images D2a, D2b, D2c, and D2d in the display areas a, b, c, and d of the projectors PJa to PJd has the density distribution that the density of feature points (denoted by circular black points) is increased in the overlapping areas.

For example, noting the projector PJa, the pattern image D2a of the projector PJa has the density distribution that the density of feature points is increased in the areas corresponding to the overlapping areas overlapping the projection areas of other projectors. The density of feature points is expressed by the number of feature points per unit area in the display area or the projection area of each projector.

In this way, when the density of feature points is set greater in the areas, which correspond to the overlapping areas overlapping the projection areas of other projectors, in the projection area of each projector, it is preferable that the setting is performed to all the projectors constructing the multi-projection system. However, a case may be considered, where the setting shown in FIG. 2 is performed to most of a plurality of projectors constructing the multi-projection system, not to all of the plurality of projectors. Further, a case may be considered, where the setting shown in FIG. 2 is performed to any one of the plurality of projectors, not to all or most of the plurality of projectors. In these settings, the corresponding advantages may be also obtained.

In the exemplary embodiments of the present invention, the density distributions of feature points of the pattern images D2a to D2d of the projectors PJa to PJd can be also set in accordance with the number of overlapping areas (how many projection areas are overlapped). This setting will be described with reference to FIG. 3.

Figure 3:
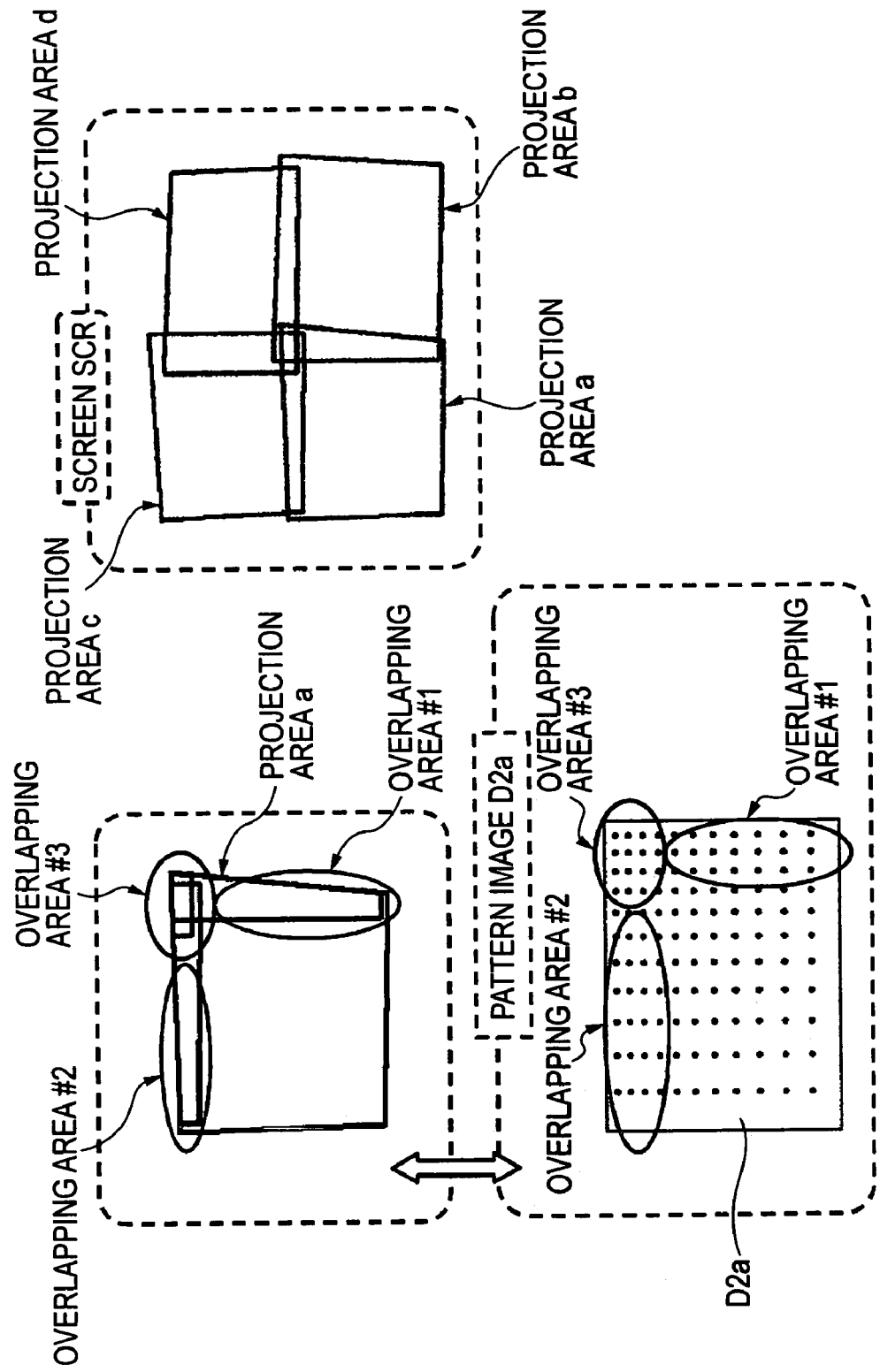
FIG. 3 is a schematic showing an example of setting the density distribution of feature points of a pattern image depending upon the overlapping number of overlapping areas.

FIG. 3 is a schematic showing a case where the projector PJa is noted. In the example shown in FIG. 3, the overlapping areas where the projection areas of other projectors overlaps the projection area of the projector PJa include an area where two projection areas are overlapped, an area where three projection areas are overlapped, and an area where four projection areas are overlapped. However, for the purpose of simplifying description, two areas of the area where two projection areas are overlapped and the area where four projection areas are overlapped in the maximum, are considered.

In this case, the area where two projection areas are overlapped includes an overlapping area (referred as overlapping area #1) where the projection area b of the projector PJb overlaps the projection area a of the projector PJa and an overlapping area (referred as overlapping area #2) where the projection area c of the projector PJc overlaps the projection area a of the projector PJa. The area where the maximum four projection areas are overlapped includes an overlapping area where the projection area b of the projector PJb, the projection area c of the projector PJc, and the projection area d of the projector PJd overlaps the projection area a of the projector PJa, which is referred to as an overlapping area #3.

The strict definition of area may not be performed to the overlapping areas #1, #2, and #3, and, for example, areas surrounding the substantial overlapping areas or areas including most of the substantial overlapping areas may be defined.

In this way, considering the overlapping areas depending upon the number of overlapped projection areas, the density of feature points is set higher with increase in the number of overlapped areas (referred to as overlapping number). In the example shown in FIG. 3, the overlapping number of the overlapping areas #1 and #2 is '2' and the overlapping number of the overlapping areas #3 is '4', which is the maximum number.

Therefore, in this case, in the pattern image D2a of the projector PJa, the density of feature points in the areas corresponding to the overlapping areas #1 and #2 is set higher than that in an area except for the overlapping areas, and the density of feature points in the area corresponding to the overlapping area #3 is set higher than the density of feature points in the area corresponding to the overlapping areas #1 and #2.

This is because it is difficult to obtain the geometric consistency as the number of overlapped areas at a position in the projection area of the noted projector is increased. Accordingly, by increasing the density of feature points in the area corresponding to the large overlapping number, it is possible to more accurately acquire the geometric consistency in the overlapping areas.

It is preferable that such a setting is performed to all the projectors, but a case may be considered, where the setting shown in FIG. 3 is performed to most of a plurality of projectors, not to all the plurality of projectors. Further, a case may be also considered, where the setting shown in FIG. 3 is performed to any one of the plurality of projectors, not to all or most of the plurality of projectors. In these settings, the corresponding advantages may be also obtained.

When the geometric correction function is formed on the basis of the association between both feature points using the pattern image D2 (pattern image D2 where the density of feature points in the overlapping areas are set higher than that in the other areas) shown in FIG. 2 and the pattern-photographed image data (denoted by D3 and referred to as pattern-photographed image D3) obtained by projecting the pattern image D2 onto the screen SCR and photographing the projected pattern image, the geometric correction function becomes a geometric correction function enabling proper geometric correction in the overlapping areas. Therefore, it is possible to perform the proper geometric correction in the overlapping areas by performing the geometric correction using the geometric correction function, thereby reducing or preventing the defocus in the overlapping areas.

Similarly, when the geometric correction function is formed on the basis of the association between both feature points using the pattern image (pattern image D2 where the density of feature points is set higher in an area corresponding to the large overlapping number) shown in FIG. 3 and the pattern-photographed image D3 obtained by projecting the pattern image D2 onto the screen SCR and photographing the projected pattern image, the geometric correction function becomes a geometric correction function enabling further proper geometric correction in the overlapping areas. Therefore, it is possible to perform the further proper geometric correction in the overlapping areas by performing the geometric correction using the geometric correction function, thereby further reducing or preventing the defocus in the overlapping areas.

An error estimation is performed to the formed geometric correction function and the pattern image D2 updating process may be preformed on the basis of the result of the error estimation.

Next, the pattern image updating process on the basis of the result of the error estimation for the geometric correction function will be described with reference two examples (one is referred to as a 'pattern image updating process (first thereof)' and the other is referred to as a 'pattern image updating process (second thereof)'.

Figure 4:
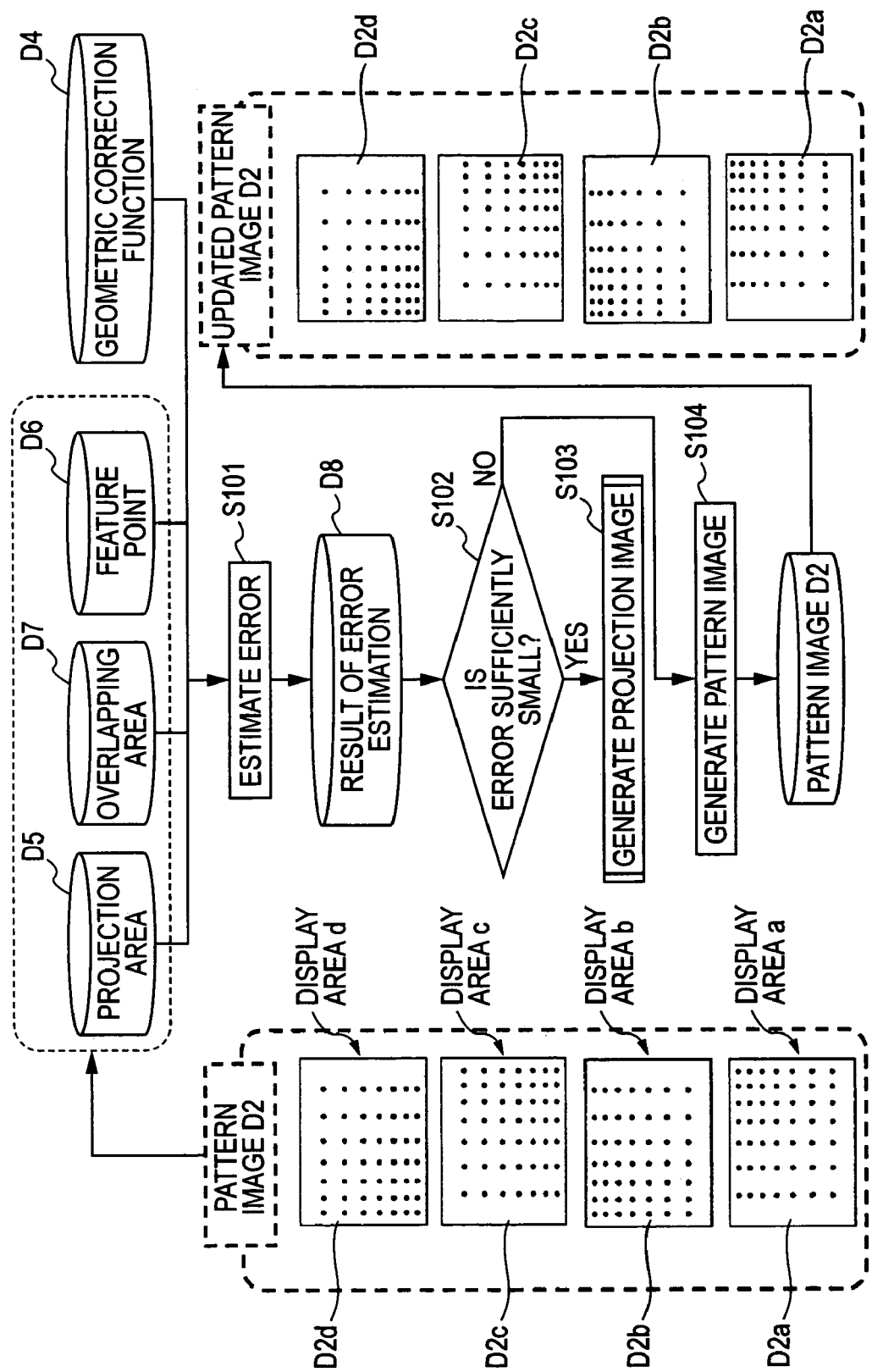
FIG. 4 is a schematic showing an example of performing error estimation to a geometric correction function and updating a pattern image on the basis of a result of the error estimation.

FIG. 4 is a schematic showing the 'pattern image updating process (first thereof)'. In FIG. 4, the pattern image D2 (individual pattern images D2a to D2d corresponding to the projectors PJa to PJd) is a pattern image in which the density distribution of feature points is set through the process shown in FIG. 2 or 3.

The updated pattern image D2 shown in FIG. 4 is a pattern image generated by a pattern image generating process for updating the feature points of the pattern image D2 when it is determined by the result data of the error estimation (denoted by D8 and referred to as a result of error estimation D8) for the geometric correction function that the error is not sufficiently small. Hereinafter, the 'pattern image updating process (first thereof)' will be described.

First, by using the pattern image D2 and the pattern-photographed image D3 obtained by projecting the pattern image D2 onto the screen SCR and photographing the projected pattern image, the geometric correction function is calculated for each projector such that the total sum of residuals calculated using the geometric association and the geometric correction function between the positional coordinates of the plural features existing in the pattern image D2 and the positional coordinates of the plural features existing in the pattern-photographed image D3 becomes the minimum value. That is, the geometric correction function of each projector is calculated using the least square method given by Expression (3).

With respect to the geometric correction function (denoted by reference letters D4 and referred to as geometric correction function D4) calculated in this way for each projector, the error estimation is performed (step S101) using projection area data (denoted by reference letters D5 and referred to as projection area D5), overlapping area data (denoted by reference letters D7 and referred to as overlapping area D7), and feature point data (denoted by reference letters D6 and referred to as feature point D6) of the pattern image D2, thereby obtaining the result of the error evaluation D8. Details of the error estimation process in the step S101 will be described later.

It is determined for the error estimation result D8 whether the error is sufficiently small (step S102), and when the error is sufficiently small, the process of generating the projection images to be projected from the projectors is started (step S103). On the other hand, when the error is not sufficiently small, the pattern image generating process for updating the pattern images is performed (step S104), thereby obtaining the updated pattern images D2.

The pattern image generating process for updating the pattern image is a process for changing the density distribution of a feature point of the pattern image D2, and the 'pattern image updating process (first thereof)' is a process for changing the density distribution of a feature point by shifting the feature point (by changing the coordinate position of the feature point).

That is, as can also be seen from FIG. 4, in the pattern image D2 after update, the number of feature points of the pattern images D2a to D2d respectively corresponding to the projectors PJa to PJd is not changed, but the density distribution of feature points in a region corresponding to the overlapping region is changed.

Further, FIG. 4 shows an example in which the pattern images D2a to D2d respectively corresponding to all the projectors PJa to PJd are updated. However, the pattern images D2a to D2d respectively corresponding to all the projectors PJa to PJd are not necessarily updated. For example, it is not necessary to perform the update of a pattern image on the projector having a sufficiently small value as the result of error estimation.

As such, when the update of the pattern image is completed, a geometric correction function is generated again using the updated pattern image D2, and steps after step S101 are performed on the generated geometric correction function. The steps are performed until the error estimation results in all the projectors are sufficiently small. As a result, when the error estimation results in all the projectors are sufficiently small, projection images to be projected from the respective projectors are generated (step S103).

Further, as described above, it is preferable that the error estimation results in all the projectors be sufficiently small. However, even when the error estimation results in most of a plurality of projectors are sufficiently small and the error estimation results in the other projectors are not sufficiently small, it is possible to obtain a high-quality image in practice.

It is possible to create a proper geometric correction function for the overlapping region by performing the above-mentioned 'pattern image updating process (part 1)'. In this way, it is possible to perform high-accuracy geometric correction in the overlapping region, and it is possible to perform high-accuracy geometrical matching in the overlapping region. Therefore, it is possible to reduce or prevent defocus easily generated in the overlapping region.

Next, a 'pattern image updating process (part 2)' will be described.

Figure 5:
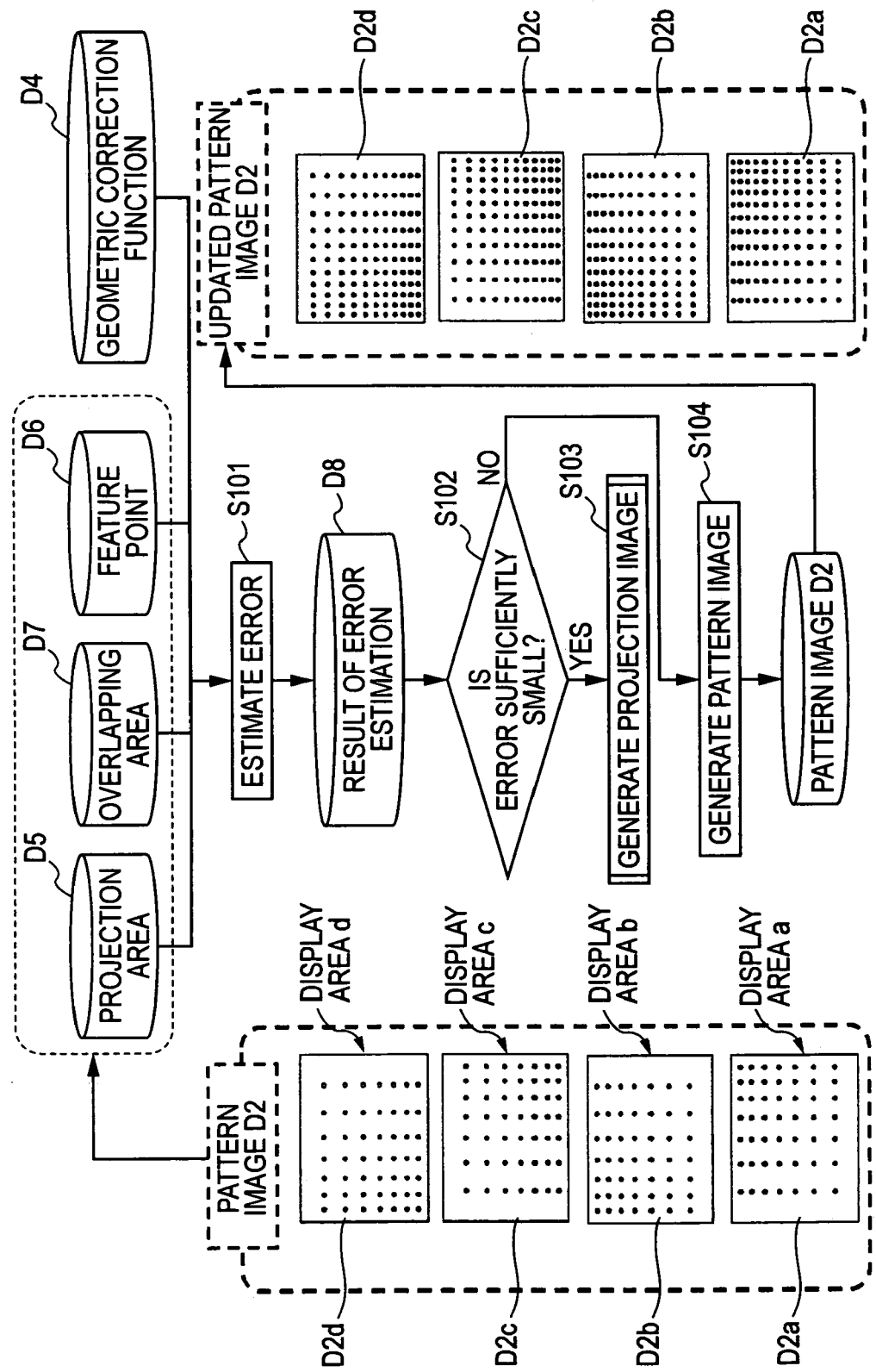
FIG. 5 is a schematic showing another example of performing error estimation to a geometric correction function and updating a pattern image on the basis of a result of the error estimation.

FIG. 5 is a schematic showing the 'pattern image updating process (part 2)'. Steps S101 to S104 in FIG. 5 are substantially the same as those in FIG. 4, except a pattern image generating process (step S104) for updating a pattern image when it is determined that an error of an error estimation result D8 is not sufficiently small (step S102).

That is, in the 'pattern image updating process (part 2)', a process of changing the density distribution of a feature point when it is determined that the error is not sufficiently small changes the density distribution of the feature point by adding or subtracting the feature point of the pattern image. In addition, the feature point of the pattern image is added or subtracted by performing the addition or subtraction of the feature point or by performing both the addition and the subtraction of the feature point.

As can be seen from FIG. 5, a pattern image D2 after update in the 'pattern image updating process (part 2)' changes its density distribution by adding or subtracting the number of features thereof with respect to the pattern images D2a to D2d respectively corresponding to the projectors PDa to PJd. In an example of FIG. 5, in the respective pattern images D2a to D2d, the feature points are added such that many feature points are concentrated in a region corresponding to the overlapping region.

In the 'pattern image updating process (second thereof)', when the update of the pattern image is completed, a geometric correction function D4 is generated again using the updated pattern image D2, and steps after step S101 are performed on the generated geometric correction function D4.

It is possible to create a proper geometric correction function for the overlapping region by performing the pattern image update process by the 'pattern image updating process (second thereof)', similar to the 'pattern image updating process (first thereof)'. In this way, it is possible to perform high-accuracy geometric correction in the overlapping region, and it is possible to perform high-accuracy geometrical matching in the overlapping region. Therefore, it is possible to reduce or prevent defocus easily generated in the overlapping region.

Further, in the above-mentioned 'pattern image updating process (first thereof)' and 'pattern image updating process (second thereof)', a process for changing the density distribution of feature points of the pattern image D2 can be performed on both the display region of the projector and the projection region on the screen from the projector.

Figure 6:
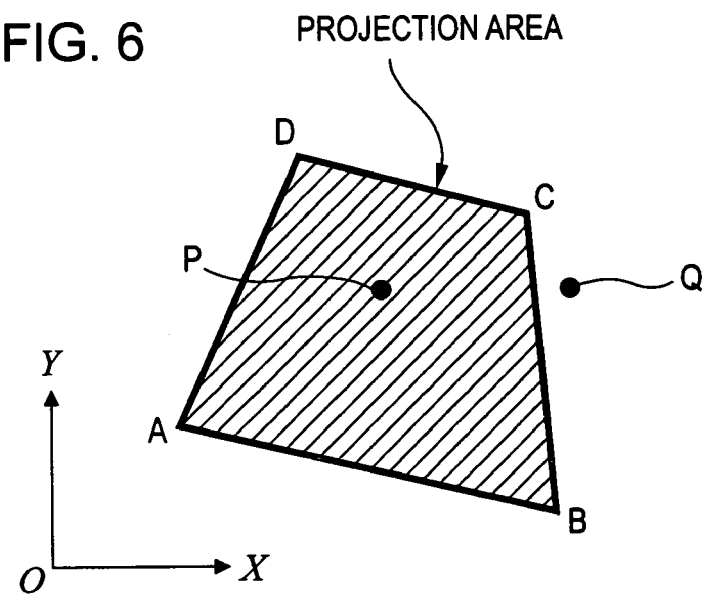
FIG. 6 is a schematic showing an example of a method of calculating an overlapping area.

Therefore, as described above, in exemplary embodiments of the present invention, the density distribution of feature points is set such that the density of the feature points in the overlapping region increases. In order to address or achieve this, it is necessary to acquire an overlapping region in which a projection region of a projector overlaps a projection region of another project. An example of the method of acquiring the overlapping region will be described with reference to FIG. 6. In FIG. 6, the coordinates of a point A is (1, 1), the coordinates of a point B is (5, 0), the coordinates of a point C is (4, 4), the coordinates of a point D is (2, 5), the coordinates of a point P is (3, 3), and the coordinates of a point Q is (5, 3). Further, the origin of the X and Y coordinates of the projection region is 'O'.

Process 1: Side vectors of a specific projection region are defined counterclockwise, and a vector AB, a vector BC, a vector CD, and a vector DA are calculated. Then, the following vectors AB, BC, CD, and DA are obtained:

[Formula 4]

$$\overline{AB} = \overline{OB} - \overline{OA} = (4,-1)^T$$

$$\overline{BC} = \overline{OC} - \overline{OB} = (-1,4)^T$$

$$\overline{CD} = \overline{OD} - \overline{OC} = (-2,1)^T$$

$$\overline{DA} = \overline{OA} - \overline{OD} = (-1,-4)^T \quad (4)$$

Process 2: The cross product of a side vector and another vector extending from a starting point of the side vector to the coordinates of a target position is calculated. This is performed on all vectors of the projection region.

[When a target position is the point P]
[Formula 5]

$$\overline{AB} \times \overline{AP} = 10, \overline{AP} = (2,2)^T$$

$$\overline{BC} \times \overline{BP} = 5, \overline{BP} = (-2,3)^T$$

$$\overline{CD} \times \overline{CP} = 3, \overline{CP} = (-1,-1)^T$$

$$\overline{DA} \times \overline{DP} = 6, \overline{DP} = (1,-2)^T \quad (5)$$

[when a target position is the point Q]
[Formula 6]

$$\overline{AB} \times \overline{AQ} = 12, \overline{AQ} = (4,2)^T$$

$$\overline{BC} \times \overline{BQ} = -3, \overline{BQ} = (0,3)^T$$

$$\overline{CD} \times \overline{CQ} = 1, \overline{CQ} = (1,-1)^T$$

$$\overline{DA} \times \overline{DQ} = 14, \overline{DP} = (3,-2)^T \quad (6)$$

Process 3: When the cross product calculated in the process 2, that is, the cross product calculated by Formulas 5 and 6 is a positive value, it is determined that a target position exists in the projection region constructed by side vectors thereof.

Therefore, in Formula 5, since the cross products of side vectors and vectors extending from starting points of the side vectors to the point P are positive values, the point P is determined to be in the region. Meanwhile, in Equation (6), since at least one of the cross products of side vectors and vectors extending from starting points of the side vectors to the point Q has a negative value, the point Q is determined to be outside the region.

When the processes 1 to 3 are performed on all the projection regions of the projectors, it is possible to calculate which projector includes the coordinates of a target position in its projection region. Then, it is possible to evaluate the overlapping region using this information.

The image correcting method for a multi-projection system according to the exemplary embodiment of the present invention has been described above. Hereinafter, an image correcting device for the multi-projection system for realizing this image correcting method and a multi-projection system having the image correcting device will be described.

FIG. 7 is a block schematic showing an exemplary embodiment of the multi-projection system according to the present invention. The multi-projection system is mainly divided into a plurality of projectors (four projectors in the present exemplary embodiment) PJa to PJd for projecting an allocated image on a screen SCR, a camera 1 functioning as an image capturing device to photograph the screen SCR, and an image correcting device 2 (which will be described later in detail) for realizing an image correcting method for the multi-projection system described above with reference to FIGS. 1 to 5. The image correcting device 2 functions as an image correcting device for the multi-projection system according to the exemplary embodiment of the present invention. In addition, four projectors are shown in FIG. 7, but the number of projectors is not limited thereto.

Further, data mainly required in the present exemplary embodiment includes projection image data D1 projected from the projectors PJa to PJd, pattern image data D2 used for performing the geometric association between the projection image data D1 and projection regions of the respective projectors, pattern photographing image data D3 obtained by photographing image patterns projected on the screen SCR from the projectors PJa to PJd using the camera 1, and a geometric correction function D4 for giving the geometrical conversion relationship between the display regions on the projectors PJa to PJd and the projection regions of the projectors PJa to PJd.

Furthermore, in the present exemplary embodiment, the projection image data D1, the pattern image data D2, and the pattern photographing image data D3 are simply referred to as a projection image D1, a pattern image D2, and a pattern photographing image D3. In addition, in the figures for illustrating the exemplary embodiments of the present invention, these data D1 to D3 are respectively represented as the projection image D1, the pattern image D2, and the pattern photographing image D3.

The detailed function of the image correction unit 2 will be described below. However, as schematic functions, the image correction unit 2 has a function for calculating the geometric correction function to project the images geometrically in the projection area corresponding to the each projector on the screen SCR without the geometrical contradiction of the pattern image D2 and the pattern photographed image D3 corresponding to the respective projectors PJa to PJd photographed by the camera 1 and a function which performs the image process of the projection image using the geometrical correction function and transmits the geometrically corrected projection image (corrected projection image) to the respective projectors PJa to PJd.

Figure 8:
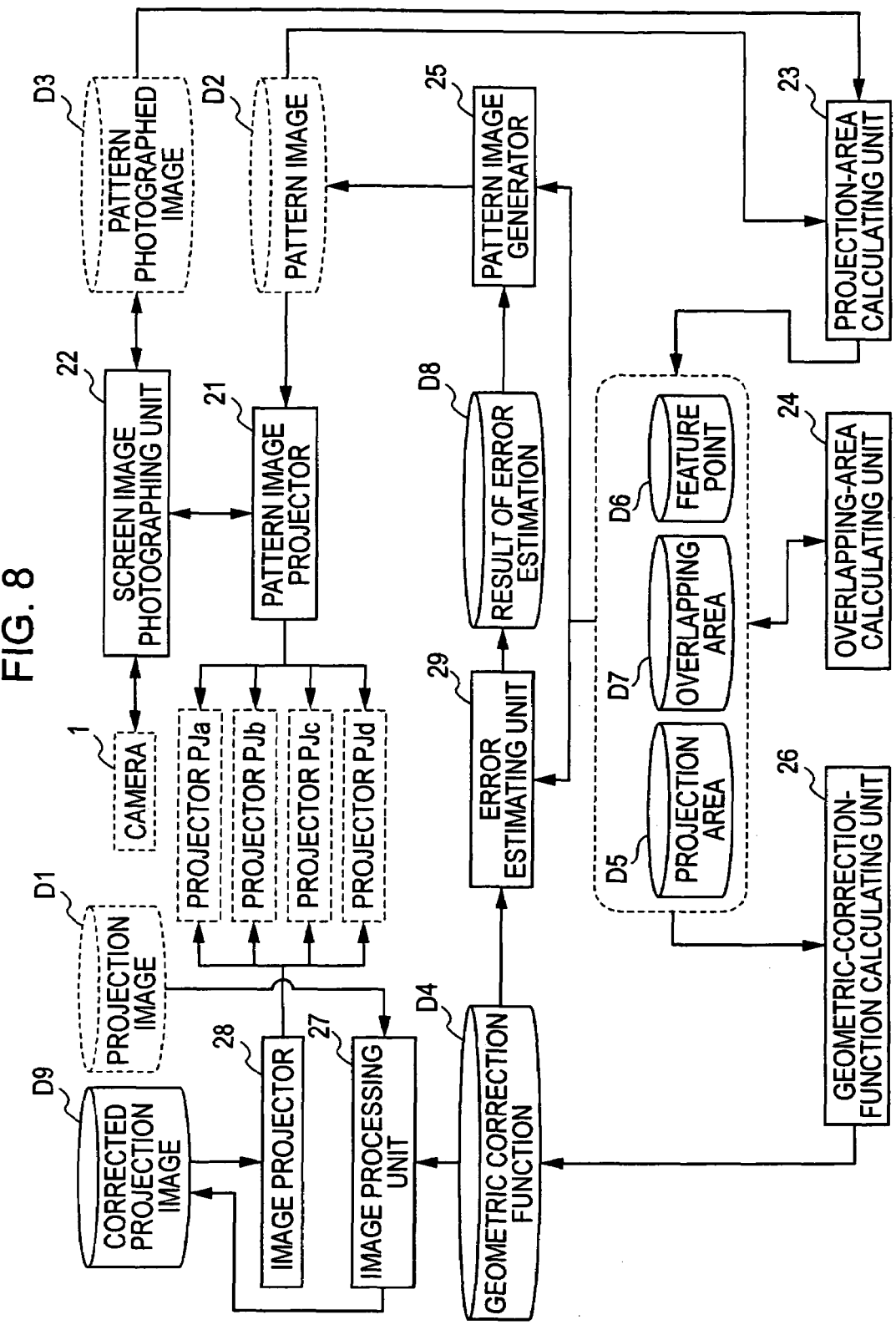
FIG. 8 is a schematic showing an image correcting device shown in FIG. 7 and constituent elements thereof and data relating thereto.

FIG. 8 is a schematic showing the image correction unit 2 illustrated in FIG. 7. In FIG. 8, as constituent elements other than the image correction unit 2, the projectors PJa to PJd, the camera 1, the projection image D1, the pattern image D2, and the patter photographed image D3 illustrated FIG. 7 may be used. The projectors PJa to PJd, the camera 1, the projection image D1, the pattern image D2, and the patter photographed image D3 illustrated FIG. 7 are indicated by the broken line in FIG. 8.

The structure of the image correction unit 2 will be described with reference to FIG. 8. The image correction unit 2 includes a pattern image projector 21, a screen image photographing unit 22, a projection-area calculation unit 23, an overlapping-area calculating unit 24, a pattern image generator 25, a geometric-correction-function calculation unit 26, an image processing unit 27, an image projector 28 and an error estimation unit 29.

In addition, the data produced by the image correction unit 2 includes projection area data D5 and feature point data D6 of the respective projectors produced on the screen by the projection-area calculation unit 23, overlapping area data D7 produced by the overlapping-area calculating unit 24, result data of error estimation D8 produced by the error estimation unit 29, geometric correction function data D4 produced by the geometric-correction-function calculation unit 26, and corrected projection image data D9 produced by the image processing device 27.

In the preferred exemplary embodiments of the present invention, the projection area data D5, the feature point data D6, the overlapping area data D7, the result data of error estimation D8 and the corrected projection image data D9 are simply referred to as a projection area D5, a feature point D6, an overlapping area D7, a result of error estimation D8 and a corrected projection image D9. In addition, for simplifying the description of the exemplary embodiments of the present invention, they are indicated by the projection area D5, the feature point D6, the overlapping area D7, the result of error estimation D8 and the corrected projection image D9.

The pattern image projector 21 has a function which supplies the pattern image D2 to the respective projectors PJa to PJd and projects the pattern image on the screen SCR from the respective projectors PJa to PJd.

The screen image photographing unit 22 has a function which photographs with a camera 1 the pattern image D2 photographed on the screen SCR from the respective projectors PJa to PJd and produces the pattern photographed image D3.

The projection-area calculation unit 23 has a function which extracts feature points from the pattern image D2 corresponding to the respective projectors PJa to PJd and the pattern photographed image D3 obtained by photographing the pattern image D2. Unit 23 stores these feature points as the feature point D6, performs the matching of the feature points of the pattern image D2 and the pattern image D3 using the stored feature point D6 and obtains the projection area D5 corresponding to the respective projectors PJa to PJd from the associating relationships of the feature points.

The overlapping-area calculating unit 24 has a function which obtains an overlapping area where the projection area of another projector overlaps the projection area of each of the projectors PJa to PJd. In addition, a method for obtaining the overlapping area using the overlapping-area calculating unit 24 uses as an example the method illustrated by using FIG. 6.

The pattern image generator 25 has a function which produces the pattern image used in the preferred exemplary embodiments of the present invention. That is, a pattern image in which the density distribution of the feature point increases on any specific area (the overlapping area in the present exemplary embodiment) in the display area or projection area of each projector. The function for producing the pattern image also has a function for updating the pattern image as described above. The function for producing the pattern image will be described below.

The geometric-correction-function calculation unit 26 has a function which constitutes a least squares method based on the projection area D5 calculated by the projection-area calculation unit 23, the feature point D6, and the overlapping area D7 calculated by the overlapping-area calculating unit 24, performs the least squares method and obtains the geometric correction function D4 in each projector.

The image processing unit 27 has a function which performs the geometric correction of the respective projection images D1 using the geometric correction function D4 calculated by the geometric-correction-function calculation unit 26. As such, the respective projection images D1 are projected without the geometric contradiction when projecting the projection image D1 with the respective projectors PJa to PJd of the a multi-projection system of exemplary embodiments of the present invention. Further, unit 27 performs the other image process (brightness correction or color correction) and produces the corrected projection image D9.

Figure 9:
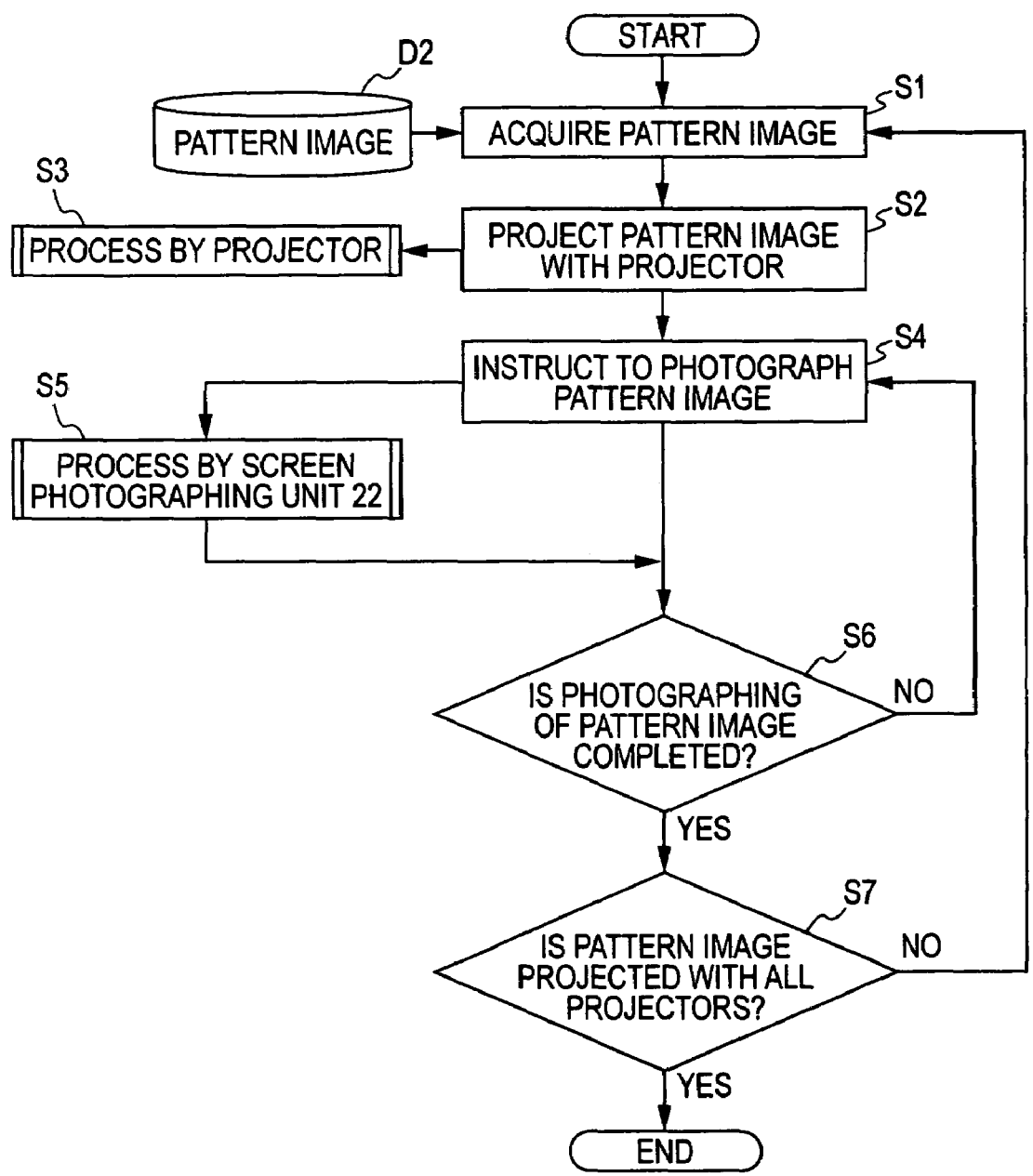
FIG. 9 is a flowchart illustrating operation of a pattern image projector shown in FIG. 8.

FIG. 9 is a flowchart illustrating the operation of the pattern image projector 21. The pattern image projector 21 operates in cooperation with the screen image photographing unit 22.

In FIG. 9, first, the pattern image D2 is acquired (step S1) and the acquired pattern image D2 is projected with any projector (step S2). Thereby, the projector enters in its process (projection process or the like) (step S3).

Next, the pattern image projector 21 instructs to the screen image photographing unit 22 photographing of the pattern image D2 photographed on the screen (step S4). Thereby, the screen image photographing unit 22 enters in its process (image photographing process of the pattern image D2 or the like) (step S5). Then, it is determined whether the photographing of the pattern image is completed (step S6), it is determined whether all of the projectors projected the pattern images when the photographing of the pattern image D2 is completed (step S7), and the process is ended when all of the pattern image are projected by all of the projectors.

Figure 10:
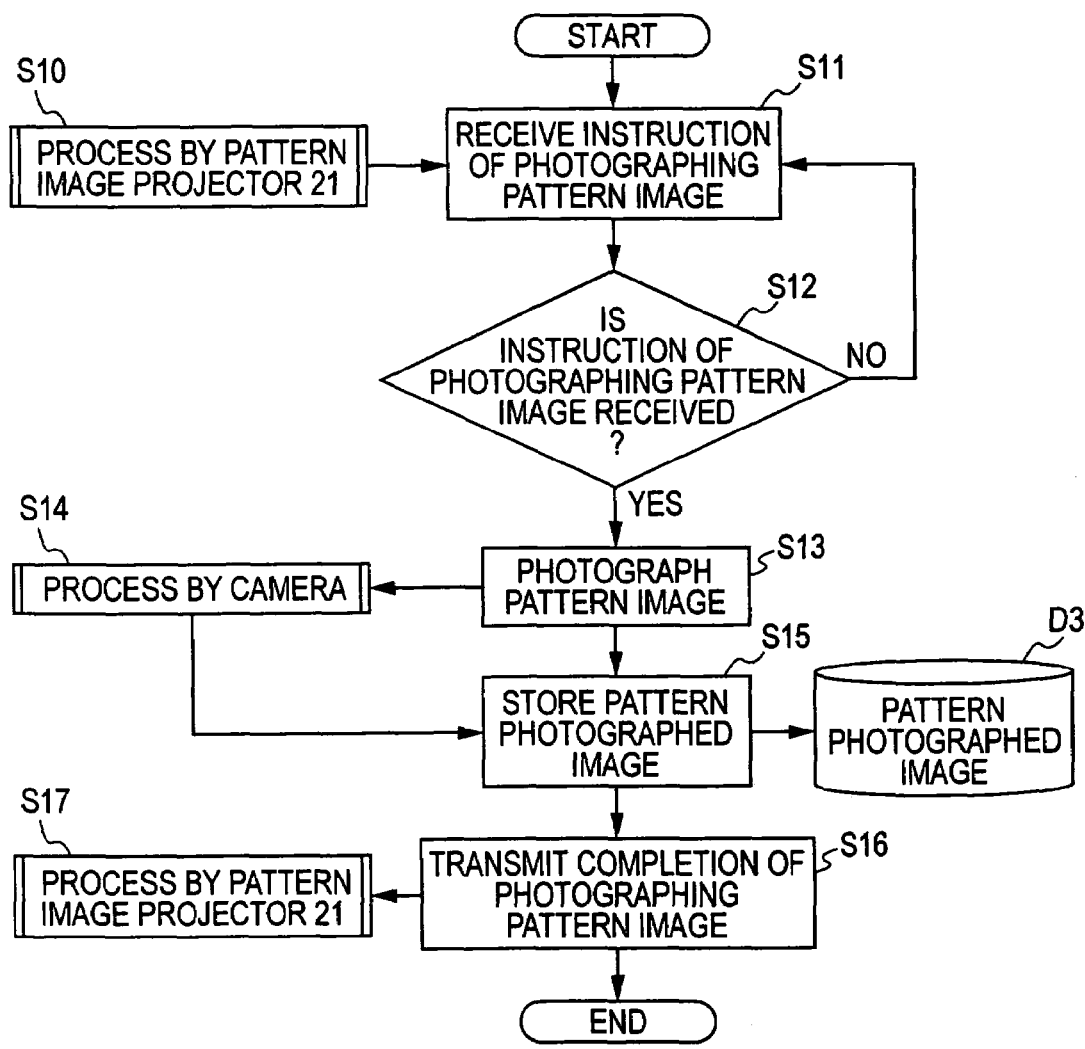
FIG. 10 is a flowchart illustrating operation of a screen photographing unit shown in FIG. 8.

FIG. 10 is a flowchart illustrating the operation of the screen image photographing unit 22. The screen image photographing unit 22 operates in cooperation with the pattern image projector 21. In other words, FIG. 10 is a diagram for describing the details of the step S5 of FIG. 9, where the sequence of the operation thereof is described.

First, in a waiting state of the instruction of photographing the pattern image D2, when the photographing of the pattern image D2 is instructed in course of the process by the pattern image projector 21 (step S10) (step 4 of FIG. 9), the screen image photographing unit 22 receives the instruction of photographing the pattern image D2 (steps S11 and S12) and performs the photographing of the pattern image D2 (step S13). Thereby, the process enters in the process by the camera 1 (photographing process)(step S14). Then, the photographed pattern image is stored as the pattern photographed image D3 (step S15) and the completion of photographing the pattern image D2 is transmitted to the pattern image projector 21 (step S16). Next, the pattern image projector 21 performs its process when its process is not completed (step S17).

Figure 11:
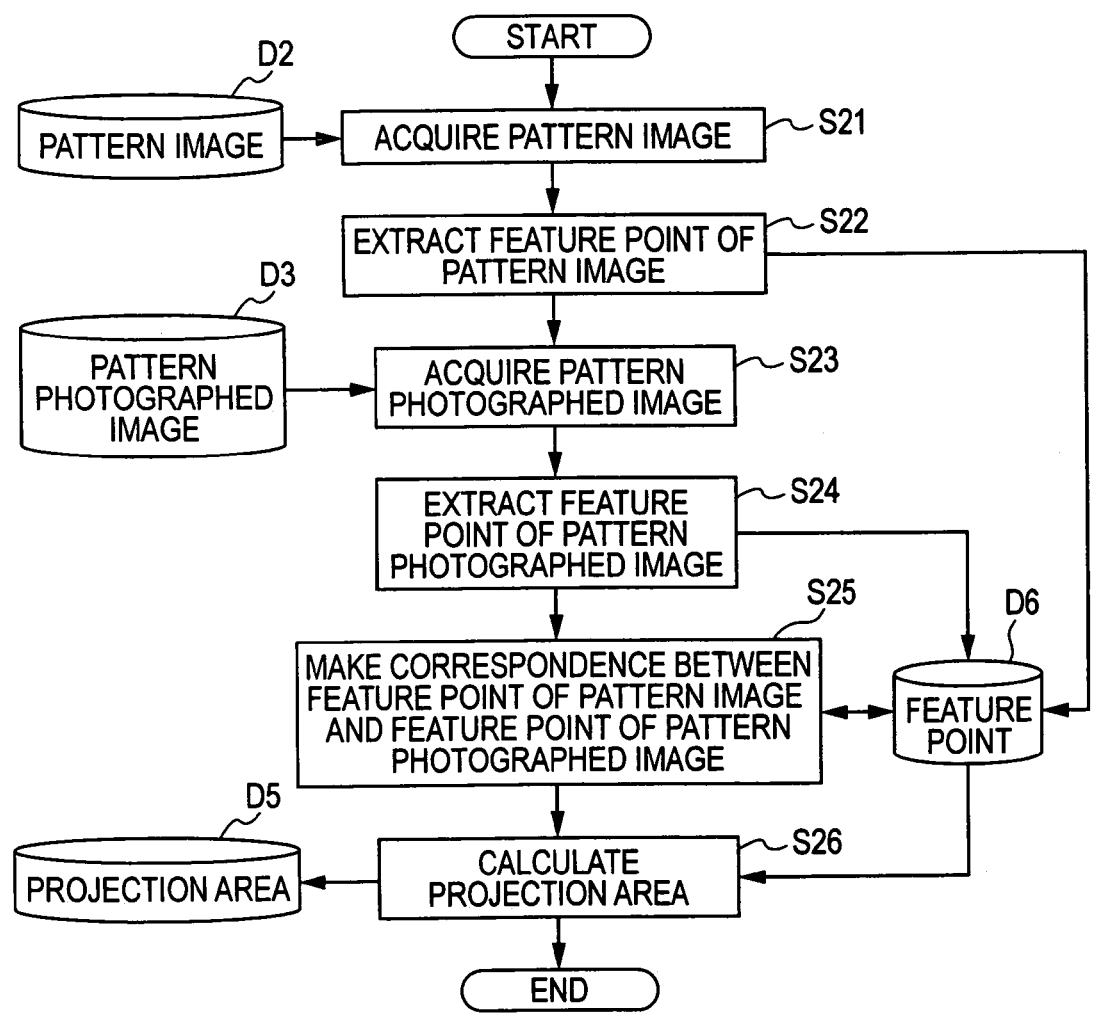
FIG. 11 is a flowchart illustrating operation of a projection-area calculating unit shown in FIG. 8.

FIG. 11 is a flowchart for describing the operation of the projection-area calculation unit 23. First, the pattern image D2 is acquired (step S21), a feature point is extracted from the acquired pattern image D2 (step S22), the feature point is stored as the feature point D6. Next, the pattern photographed image D3 is obtained (step S23), a feature point is extracted from the acquired photographed image D3 (step S24), and the feature point is stored as the feature point D6. In addition, the mapping between the feature point of the pattern image D2 and the feature point of the pattern photographed image D3 is performed (step S25), the projection area is calculated (step S26) and the calculated are is stored as the projection area D5.

Here, the feature point of the pattern image D2 and the feature point of the pattern photographed image D3 that are extracted by the projection-area calculation unit 23 will be described.

In FIG. 12A, (i) and (ii) are diagrams illustrating an example of the pattern image D2. In FIG. 12B, (i) and (ii) are diagrams illustrating an example of the pattern photographed image D3 obtained by photographing one obtained by photographing the pattern image D2 on the screen SCR with the camera 1.

For example, edges by the brightness difference or color difference or intersections (corners) of the edges, a peak value of the brightness information or color information and the central point of the brightness information or color information distributed geometrically may be used as the feature points of the pattern image D2.

In addition, the feature point is calculated from the geometrical shape information produced by using the brightness information, the color information, and the brightness information and color information in the pattern image D2 (in actual, the feature point is previously determined and one represented in the geometrical shape that the feature point is produced by using the color information, the brightness information and the color information and the brightness information is used as the pattern image D2).

On the other hand, a coordinate of the feature point of the patter photographed image D3 is determined from the geometrical shape information produced by using the brightness information, the color information, the brightness information and the color information of the pattern photographed image D3.

The mapping between the feature point of the pattern image D2 and the feature point of the pattern image D3 uses a method that have as the restrict conditions the color information of the pattern image D2 (matching by the color), the brightness information of the pattern image (matching by luminosity), the geometrical information (for example, the matching by the triangle and quadrangle and the matching by the positional relationships of the feature points) and the time information when the projection of the pattern image can be managed with the time series information or a method that assumes the projection model (a projection conversion and a rational polynomial expression conversion) and uses it as the restriction condition.

According to the present exemplary embodiment, the coordinate of the feature points of the pattern image D2 in which the geometrical mapping is made and the coordinate of the feature point of the pattern photographed image D3 can be apprehended from the information called 'the feature point D6'. In other words, in FIG. 13, the feature point Pa of the pattern image D2 of any projector and the feature point Pa' of the pattern photographed image D3 has a corresponding relationship and the coordinate of the feature point Pa and the coordinate of the feature point Pa' can be apprehended.

On the other hand, the projection area is calculated from the feature point of the pattern image D2, the feature point of the pattern photographed image D3, the geometrical associating relationship therebetween, and the proper projection model (for example, if it is a plane screen, the projection conversion is used and if it is a continuous non-plane screen, the rational polynomial expression conversion is used).

According to the present exemplary embodiment, the mapping between the display areas of the respective projectors and the projection areas of the respective projectors can be apprehended from 'the projection area D5'. In other words, the display area a of any projector corresponds to the projection area a of the projector on the screen, for example, as shown FIG. 13.

Figure 14:
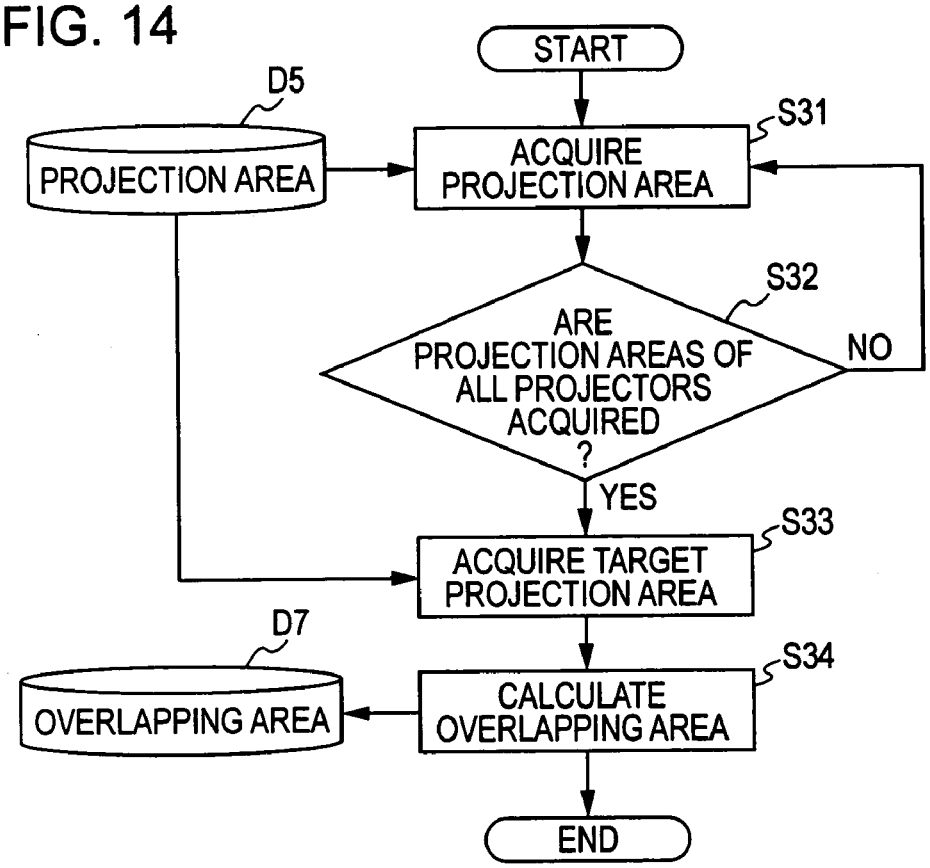
FIG. 14 is a flowchart illustrating an example of operation of an overlapping-area calculating unit shown in FIG. 8.

FIG. 14 is a flowchart for describing the operation of the overlapping-area calculating unit 24. In FIG. 14, first, the projection area D5 of each projector is obtained (steps S31 and S32). Then, the projection area subjected to the process is obtained from the projection area D5 (step S33), the overlapping area is calculated from the obtained projection area (step S34) and the overlapping area is stored as the overlapping area D7.

In the above exemplary embodiment, information referred to as 'overlapping area D7' can indicate that the arbitrary coordinate of projection area of the screen is included in which display area.

In addition, since the calculation process of the overlapping area performed by the overlapping-area calculating unit 24 has been explained with reference to FIG. 6 as an example, the detailed description will be omitted.

Figure 15:
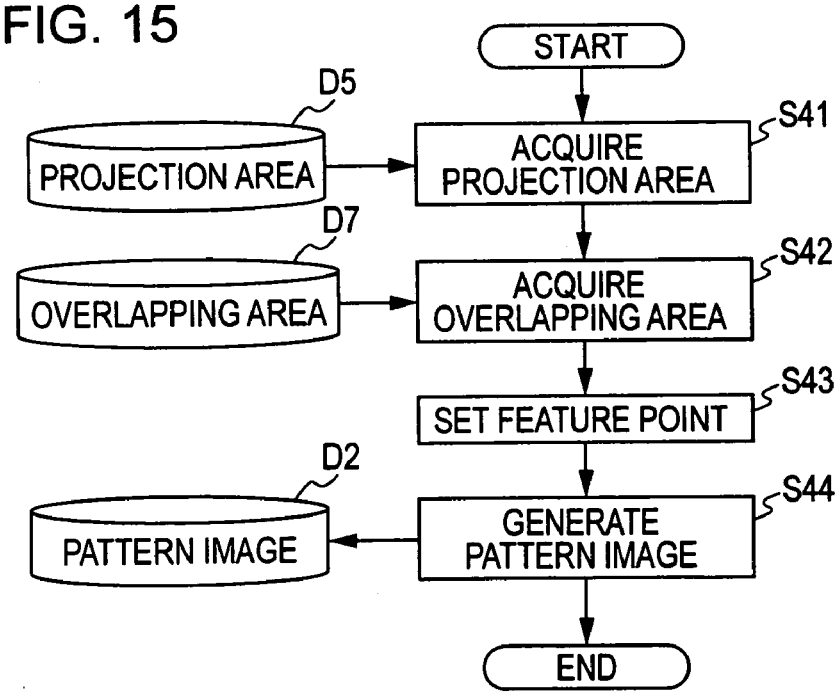
FIG. 15 is a flowchart illustrating operation of a pattern image generator shown in FIG. 8.

FIG. 15 is a flowchart illustrating operation of a pattern image generator 25. In FIG. 15, a projection area D5 and an overlapping area D7 are obtained (step S41, S42). Therefore, the density distribution of feature points is set based on the obtained projection area D5 and overlapping area D7 (step S43). For example, as shown in FIGS. 2 and 3, the density distribution of the feature points is set so as to concentrate the feature points in the overlapping area and the resulting pattern image D2 in which the density distribution of the feature points is set as mentioned above is generated (step S44). Further, the method of setting the density distribution of feature points shown in FIGS. 2 and 3 is referred to as 'a first feature point setting method'.

A specific example of 'the first feature point setting method' performed by the pattern image generator 25 will be explained. For example, as shown in FIG. 16, a method of setting of feature points of a pattern image D2a on a display area a of a projector PJa and a pattern image D2b on a display area b of a projector PJb will be explained. The display areas a and b correspond to projection areas a and b on a screen SCR of two projectors (PJa, PJb). Further, in drawings, $Z_{a \leftarrow b}$ shows that the projection area b is overlapped in the projection area a, and $Z_{b \leftarrow a}$ shows that the projection area a is overlapped in the projection area b.

Here, focused on the projector PJb, the method of setting the feature points in the pattern image D2b of the projector PJb will be explained with reference to FIG. 17.

Figures 17A, 17B:
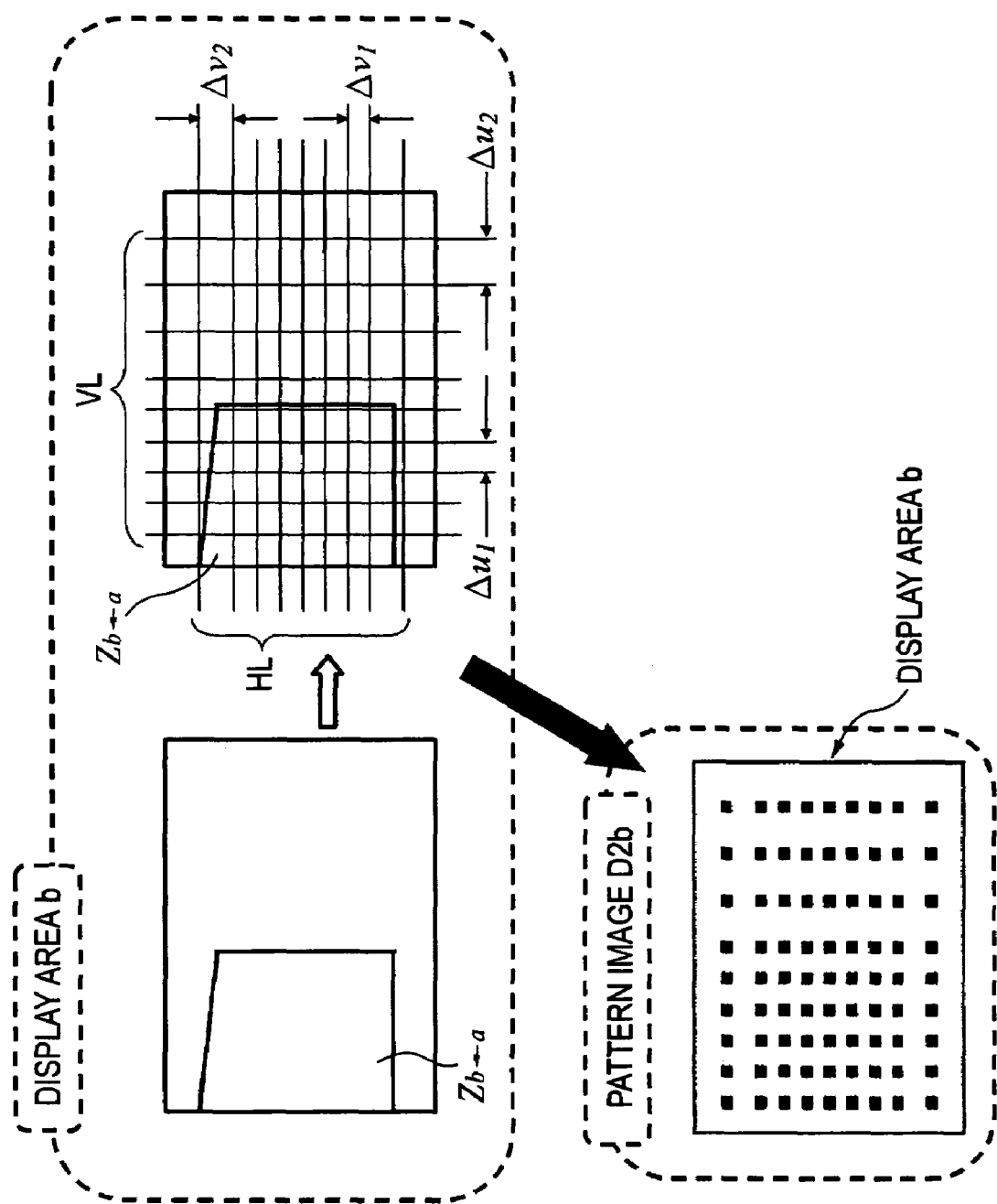
FIGS. 17A-B are schematics showing a specific example of the first feature-point defining method shown in FIG. 16.

Firstly, as shown in FIG. 17A, the display area b of the projector PJb is divided into a plurality of vertical lines VL and a plurality of horizontal lines HL. The dividing condition is that intervals between vertical lines VL and horizontal lines HL which are adjacent to each other in the overlapping area $Z_{b \leftarrow a}$ is narrower than that in an area excluding the overlapping area $Z_{b \leftarrow a}$.

If the interval between the vertical lines VL adjacent to each other in the overlapping area $Z_{b \leftarrow a}$ is $\Delta u1$ and the interval between the vertical lines VL adjacent to each other in the region excluding the overlapping area $Z_{b \leftarrow a}$ is $\Delta u2$, $\Delta u1 < \Delta u2$. Similar to this, if the interval between the horizontal lines HL adjacent to each other in the overlapping area $Z_{b \leftarrow a}$ is $\Delta v1$ and the interval between the horizontal lines HL adjacent to each other in the region excluding the overlapping area $Z_{b \leftarrow a}$ is $\Delta v2$, $\Delta v1 < \Delta v2$.

If the vertical lines VL and the horizontal lines HL are set according to the above conditions, a geometric shape suitable for the feature points is set at intersection of the plurality of the vertical lines VL and the plurality of the horizontal lines HL. The geometric shape suitable for the feature point may be various geometric shapes, for example, the shape may be the circular black points shown in FIGS. 2 to 5 or the rectangular black points shown in FIG. 17. Further, the color is not limited to black.

As mentioned above, by setting the feature points, it is possible to increase the density of the feature points in the overlapping area $Z_{b \leftarrow a}$. As a result, it is further possible to obtain the pattern image D2b shown in FIG. 17B.

Further, in FIGS. 16 and 17, the method of setting the feature points in the pattern image D2b of the projector PJb is explained focusing on the projector PJb. However, the feature points can be set by the same process with respect to other projectors.

Next, another example of a feature point setting method (it is referred to as 'a second feature point setting method') will be explained. The 'second feature point setting method increases the density of the feature points in a specific area (overlapping area) by moving the coordinate position of the feature points of the pattern image.

Figure 18:
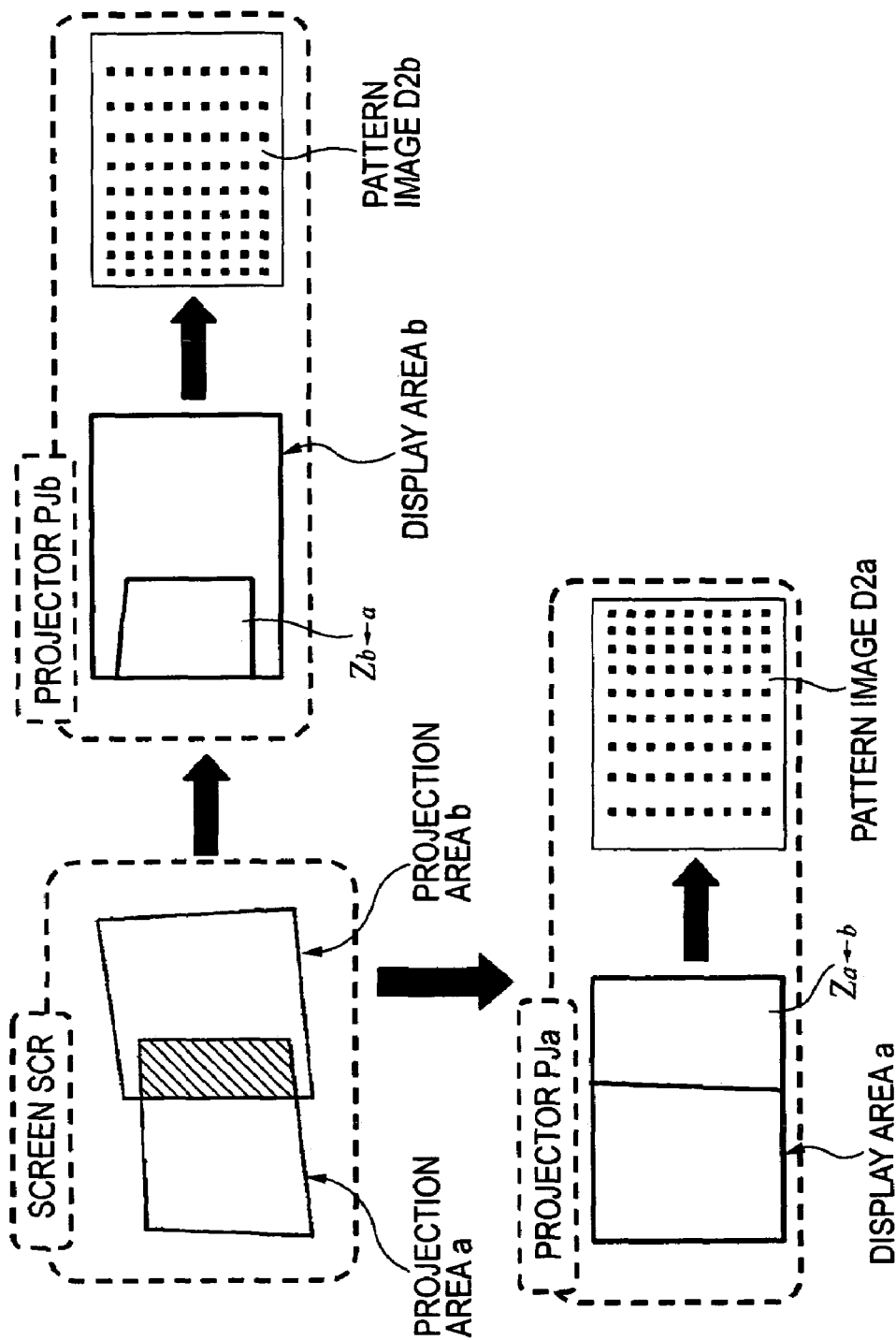
FIG. 18 is a schematic showing a second feature-point defining method which is performed by the pattern image generator show in FIG. 8.

For example, as shown in FIG. 18, a method of setting of feature points of a pattern image D2a on a display area a of a projector PJa and a pattern image D2b on a display area b of a projector PJb will be explained. The display areas a and b correspond to projection areas a and b on a screen SCR of two projectors (PJa, PJb). Further, in drawings, $Z_{a \leftarrow b}$ shows that the projection area b is overlapped in the projection area a, and $Z_{b \leftarrow a}$ shows that the projection area a is overlapped in the projection area b.

Here, focusing on the projector PJa, the method of setting the feature points in the pattern image D2a of the projector PJa will be explained with reference to FIG. 19.

Figure 19:
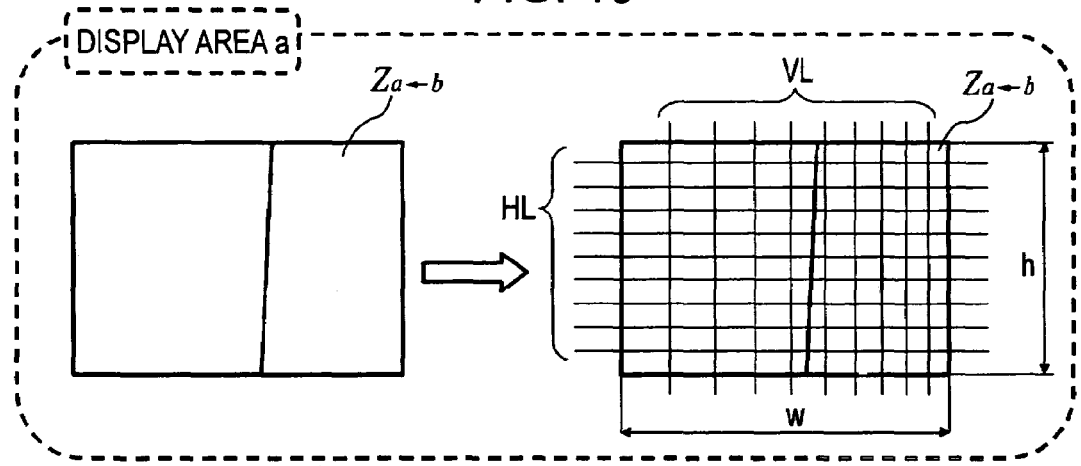
FIG. 19 is a schematic showing a specific example of the second feature-point defining method shown in FIG. 18.

Firstly, as shown in FIG. 19, the display area a of the projector PJa is divided into a plurality of vertical lines VL and a plurality of horizontal lines HL and the feature points are set at intersections of the plurality of vertical lines VL and a plurality of horizontal lines HL. In this case, the dividing condition is set using the following Formula so as to concentrate the vertical lines VL and horizontal lines HL much more in the overlapping area $Z_{a \leftarrow b}$.

As Formula in order to concentrate much more vertical lines VL in the overlapping area $Z_{a \leftarrow b}$, since the overlapping area $Z_{a \leftarrow b}$ is at the right side in FIG. 19, in order to concentrate the vertical lines much more at the right side, Formula 7 is used.

[Formula 7]

$$u_n = \left(1 - \frac{\exp[\alpha(1 - n/N)] - 1}{[\exp[\alpha] - 1]}\right) w \qquad (7)$$

In Formula 7, $\alpha$ is an inequality parameter, N is a divided number in a horizontal direction, w is a horizontal width, and n is a number of the vertical line VL (n=0, 1, ..., N−1, N), there are same in the following Formulas 8 to 12. When the value of the inequality parameter $\alpha$ is large, the deflection of the concentration of the vertical lines VL in the right direction becomes large. As a result, the vertical lines VL is more concentrated at the right side of the display area a.

By using Formula 7, it is possible to concentrate the vertical lines much more at the right side of FIG. 19 (overlapping area $Z_{a \leftarrow b}$). Therefore, a geometric shape (in here, rectangular black points) suitable for the feature points is set at the intersections of the vertical lines VL and the horizontal lines HL which are set as mentioned above (in this case, the process on the horizontal lines HL are not considered).

Figure 20A:
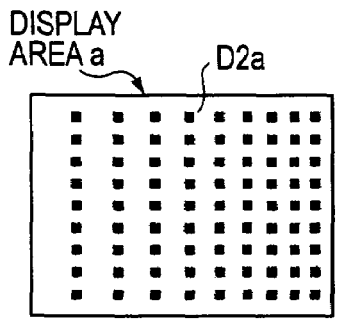
FIGS. 20A-C are schematics showing an example of defining feature points using the second feature-point defining method (cases where the feature points are concentrated on the right side, the left side, and both of the right and left sides, respectively)

If the feature points are set as mentioned above, as shown in FIG. 20A, it is possible to obtain a pattern image in which the feature points are concentrated at the right side in the display area a. Further, as mentioned above, in this case, since the process on the horizontal lines are not considered, in the example shown in FIG. 20A, the feature points are deflected only in the right direction.

In the above-mentioned example, even though the vertical lines are concentrated at the right side, when the vertical lines are concentrated much more at the left side of the display area, it is possible to perform by using the Formula 8.

[Formula 8] (8)

$$u_n = \frac{\exp[\alpha(n/N)] - 1}{[\exp[\alpha] - 1]} w$$

By using Formula 8, the vertical lines can be concentrated at the left side on the display area a in FIG. 19. Further, in the case of Formula 8, when the value of the inequality parameter α is large, the deflection of the concentration of the vertical lines VL in the left direction becomes large. As a result, the vertical lines VL is concentrated much more at the left side of the display area a.

Figure 20B:
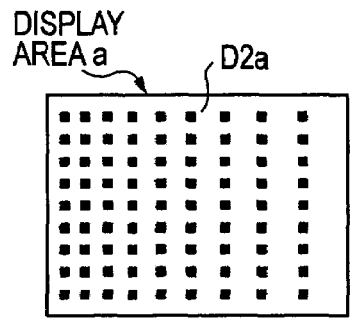

Therefore, if a geometric shape (in here, rectangular black points) suitable for the feature points is set at the intersections of the vertical lines VL and the horizontal lines HL which are set as mentioned above (in this case, the process on the horizontal lines HL are not considered), as shown in FIG. 20B, it is possible to obtain a pattern image in which the feature points are concentrated at the left side in the display area a. Further, as mentioned above, in this case, since the process on the horizontal lines are not considered, in the example shown in FIG. 20B, the feature points are deflected only in the left direction.

Furthermore, it is possible to concentrate the vertical lines much more at both sides of the right and left side. In this case, it is possible to perform by using Formula 9.

[Formula 9] (9)

$$\begin{cases} u_n = \frac{\exp[\alpha(2n/N)] - 1}{2[\exp[\alpha] - 1]} w & (0 \le u \le w/2) \\ u_n = \left(1 - \frac{\exp[\alpha(2(1-n/N))] - 1}{2[\exp[\alpha] - 1]}\right) w & (w/2 < u \le w) \end{cases}$$

By using Formula 9, the vertical lines can be concentrated at both left and right sides in FIG. 19.

Figure 20C:
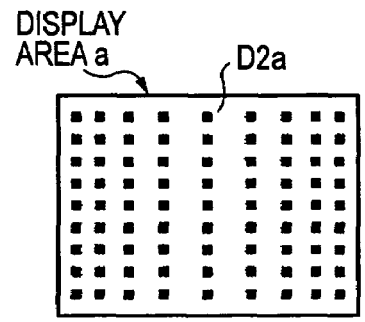

Therefore, if a geometric shape (in here, rectangular black points) suitable for the feature points is set at the intersections of the vertical lines VL and the horizontal lines HL which are set as mentioned above (in this case, the process on the horizontal lines HL are not considered), as shown in FIG. 20C, it is possible to obtain a pattern image in which the feature points are concentrated at both left and right sides in the display area a. Further, as mentioned above, in this case, since the process on the horizontal lines are not considered, in the example shown in FIG. 20C, the feature points are deflected in the left and right directions.

The process for concentrating the positions of the vertical lines VL on the right or left side or on both the right and left sides has been described with reference to FIGS. 18 to 20. However, it is also possible to concentrate the horizontal lines HL on the upper or lower side or on both the upper and lower sides.

That is, it is possible to concentrate many horizontal lines HL on the lower side, using the following Formula 10:

[Formula 10] (10)

$$v_n = \frac{\exp[\alpha(n/N)] - 1}{[\exp[\alpha] - 1]} h$$

Further, in Formula 10, a character 'h' indicates the length of the display region in the vertical direction. In case of Formula 10, the larger an inequality parameter a becomes, the closer the horizontal line HL leans to the lower side. Then, many horizontal lines HL are concentrated on the lower side of the display region a.

Figure 21A:
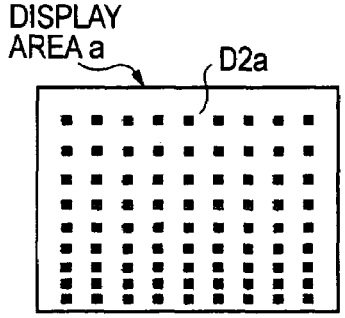
FIGS. 21A-C are schematics showing an example of defining feature points using the second feature-point defining method (cases where the feature points are concentrated on the upper side, the lower side, and both of the upper and lower sides, respectively)

When black rectangular points, serving as feature point are set at intersection of the vertical lines VL and the horizontal lines HL (in this case, a process on the vertical line VL is not considered) set in this way, it is possible to obtain a pattern image in which many feature points are concentrated on the lower side of the display region a as shown in FIG. 21A.

Further, it is possible to concentrate many horizontal lines HL on the upper side, using the following Formula 11.

[Formula 11] (11)

$$v_n = \left(1 - \frac{\exp[\alpha(1 - n/N)] - 1}{[\exp[\alpha] - 1]}\right) h$$

In addition, in case of Formula 11, the larger the inequality parameter α becomes, the closer the horizontal line HL leans to the upper side. Then, many horizontal lines HL are concentrated on the upper side of the display region a.

Figure 21B:
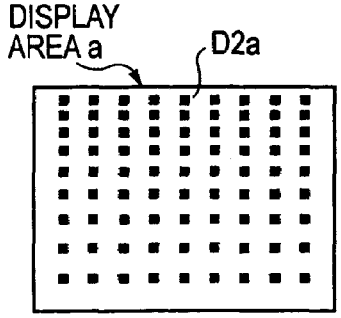

When a black rectangular point, serving as a feature point, is set at an intersection of the vertical line VL and the horizontal line HL (in this case, a process on the vertical line VL is not considered) set in this way, it is possible to obtain a pattern image in which many feature points are concentrated on the lower side of the display region a as shown in FIG. 21B.

Further, more concentration of the horizontal lines HL on the upper and lower sides can be realized by using the following Formula 12.

[Formula 12] (12)

$$\begin{cases} v_n = \frac{\exp[\alpha(2n/N)] - 1}{2[\exp[\alpha] - 1]} h & (0 \le v \le h/2) \\ v_n = \left(1 - \frac{\exp[\alpha(2(1-n/N))] - 1}{2[\exp[\alpha] - 1]}\right) h & (h/2 < v \le h) \end{cases}$$

Figure 21C:
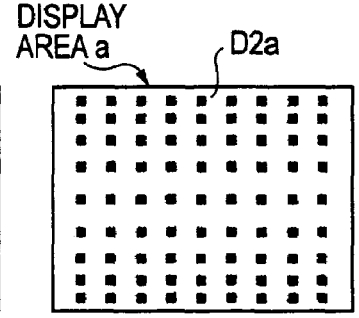

At intersections of the horizontal lines HL and the vertical lines VL set in such a manner (in this case, the process on the vertical lines VL is out of consideration), for example, the black corner points are set as the feature points, and then, as shown in FIG. 21C, a pattern image in which the feature points are more concentrated on the upper and lower sides in the display region a can be obtained.

Further, by combining the process of changing the concentration ratio of the vertical lines VL and the horizontal lines HL described by way of FIGS. 18 to 21, the density of the feature points in an arbitrary specified region of the display region can be increased. For example, in order to increase the density of the feature points in an upper left portion of the display region a, the density of the feature points in the upper left specified region of the display region a can be increased by combining the above-mentioned Formulas 8 and 11 with each other.

Moreover, in FIGS. 18 to 21, focusing on projector PJa, the method in which the feature points in the pattern image D2a of the projector PJa are set is described. According to exemplary embodiments of the present invention, however, as for other projectors, the feature points can be set in the same sequence.

As such, 'the first feature point setting method' and the second feature point setting method' are described. According to exemplary embodiments of the present invention, however, as the method for setting the density distribution of the feature points, other than the above-mentioned method, for example, a method in which the density distribution of the feature points changes according to the addition or deletion of the feature point may be used (hereinafter, referred to as 'third feature point setting method'). A specified example of 'the third feature point setting method' will be described below.

Figure 22:
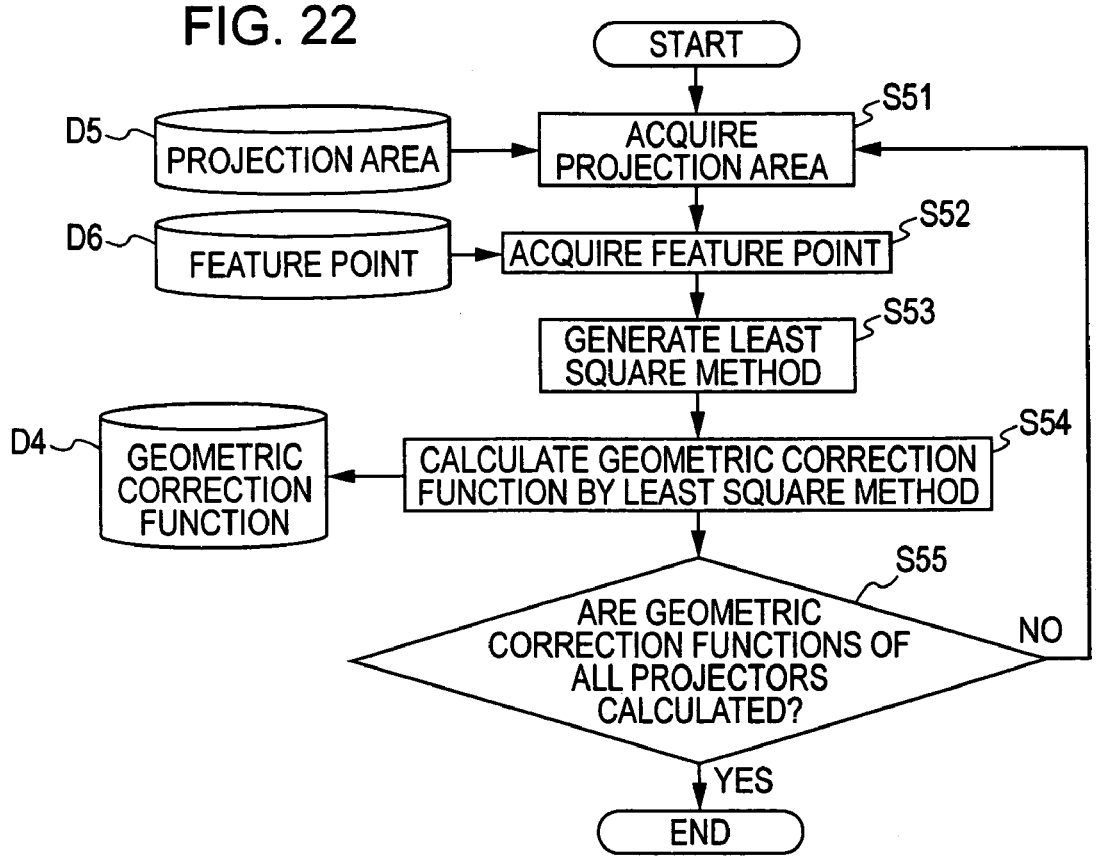
FIG. 22 is a flowchart illustrating operation of a geometric-correction-function calculating unit shown in FIG. 8.

FIG. 22 is a flowchart illustrating an operation of the geometric correction function calculating device 26. To begin with, as shown in FIG. 22, the projection region D5 and the feature point D6 are acquired (steps S51 and S52). Next, the least squares method is generated (step S53), the geometric correction function is calculated from the generated least squares method (step S54), and the calculated geometric correction function is stored as the geometric correction function D4. And then, it is determined whether or not the geometric correction functions D4 of all the projectors are calculated (step S55). If the geometric correction functions D4 of all the projectors are calculated, the process is ended.

Figure 23:
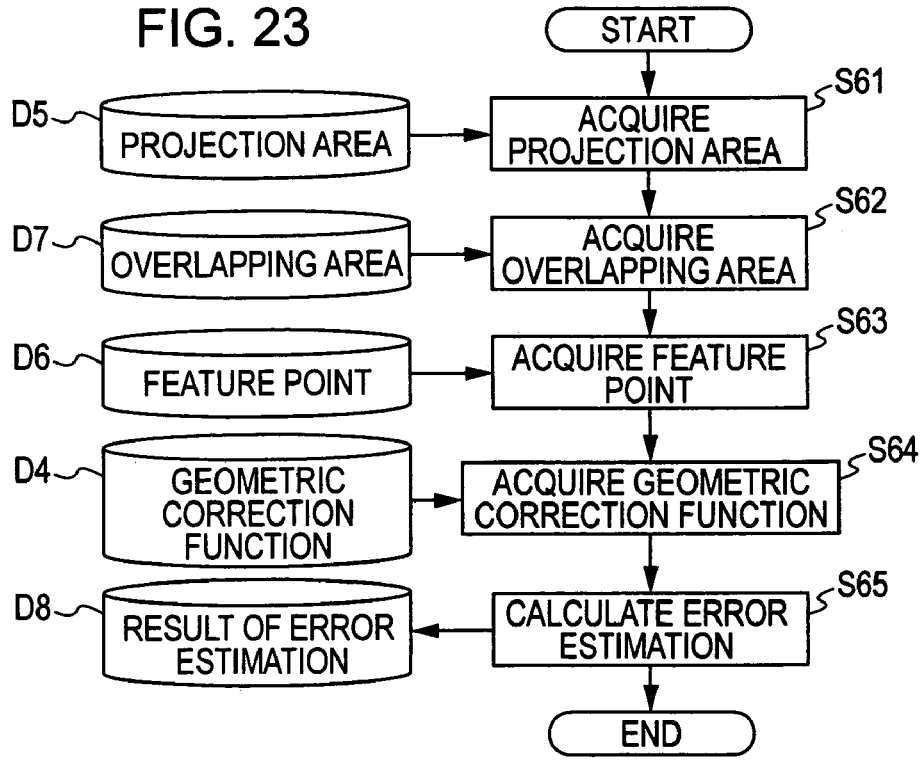
FIG. 23 is a flowchart illustrating operation of an error estimating unit shown in FIG. 8.

FIG. 23 is a flowchart illustrating an operation of the error estimating device 29. The error estimating device 29 performs the error estimation of the geometric correction functions D4 which are generated by the geometric correction function calculating device 26. The error estimating device 29 acquires the projection region D5, the overlap region D7, the feature point D6, an the geometric correction function D4 calculated in the above-mentioned S54 in FIG. 22 as data required for the error estimation (steps S61 to S64) and calculates the error estimation result D8 of the geometric correction function D4 based on acquired data (step S65).

An example of a method of calculating an error estimation result will be described. Here, an example of a method in which the error estimation is calculated by using a residual of the geometric correction function.

The residual of the geometric correction function can be represented by the following Formulas.

$$r = u - f(X) \tag{13}$$

$$R = X - F(u) \tag{14}$$

In Formulas 13 and 14, r represents the residual calculated in the display region, that is, the difference (residual) between 'the feature point of the display region' and 'an approximate value of the feature point of the projection region corresponding to the feature point of the display region, and the feature point of the display region obtained from the geometric correction function'. R represents the residual of the calculated in the projection region, that is, the difference (residual) between 'the feature point of the projection region' and 'an approximate value of the feature point of the display region corresponding to the feature point of the projection region, and the feature point of the projection region obtained from the geometric correction function'. Further, u represents a positional coordinate of the feature point of the display region, X represents a positional coordinate of the feature point of the projection region, f(X) represents a geometric correction function from the projection region to the display region, and F(u) represents a geometric correction function from the display region to the projection region.

For example, in the case of the residual of the geometric correction function in the display region, the error estimation using the residual of the geometric correction function can be calculated by the following Formula.

[Formula 15]
$$\text{RMS} = \sqrt{\frac{\sum_{i=1}^{M} r_i^2}{M}} \tag{15}$$

In Formula 15, $r_i$ represents the residual calculated from the feature point of the overlap region, M represents the number of the feature points of the overlap region. Further, RMS represents a root mean square which can be used as the error estimation result. The smaller the RMS is, the higher the precision in the overlap region of the geometric correction function becomes.

In such a manner, the error estimation result to the geometric correction function D4 is calculated, and then it is determined whether or not the pattern image is needed to be updated, based on the error estimation result. If the update of the pattern image is needed, the pattern image generation process is performed so as to update the pattern image. As the pattern image generation process for updating the pattern image, as described above, the pattern image generation process which uses 'the pattern image update process (first thereof)', that is, the pattern image generation process in which the density distribution of the feature points are changed by moving the feature points (by changing the positional coordinates), or the pattern image generation process which uses 'the pattern image update process (second thereof)', that is, the pattern image generation process in which the density distribution of the feature points are changed by adding or deleting the feature points may be considered.

Figure 24:
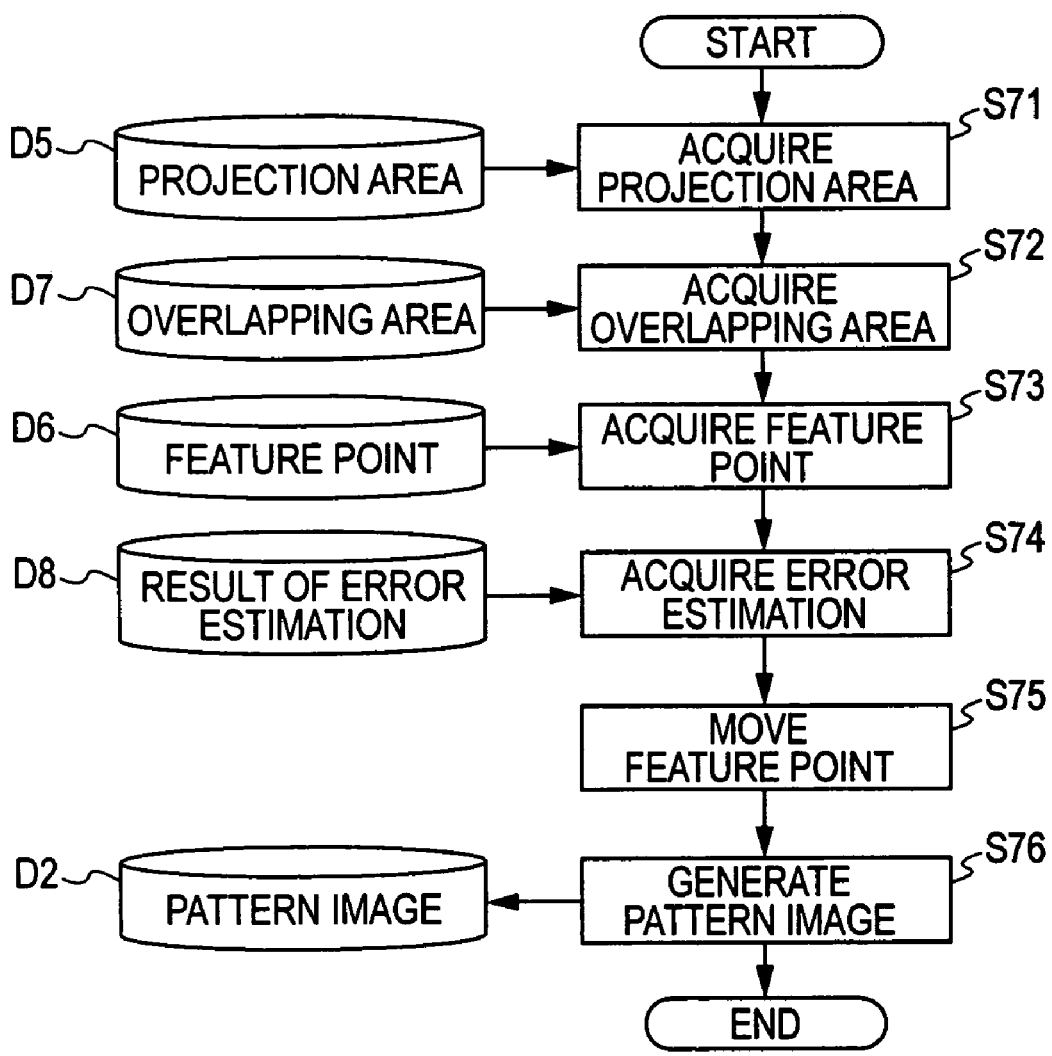
FIG. 24 is a flowchart illustrating a "pattern image updating process (first thereof)" which is performed by the pattern image generator.
Figure 26:
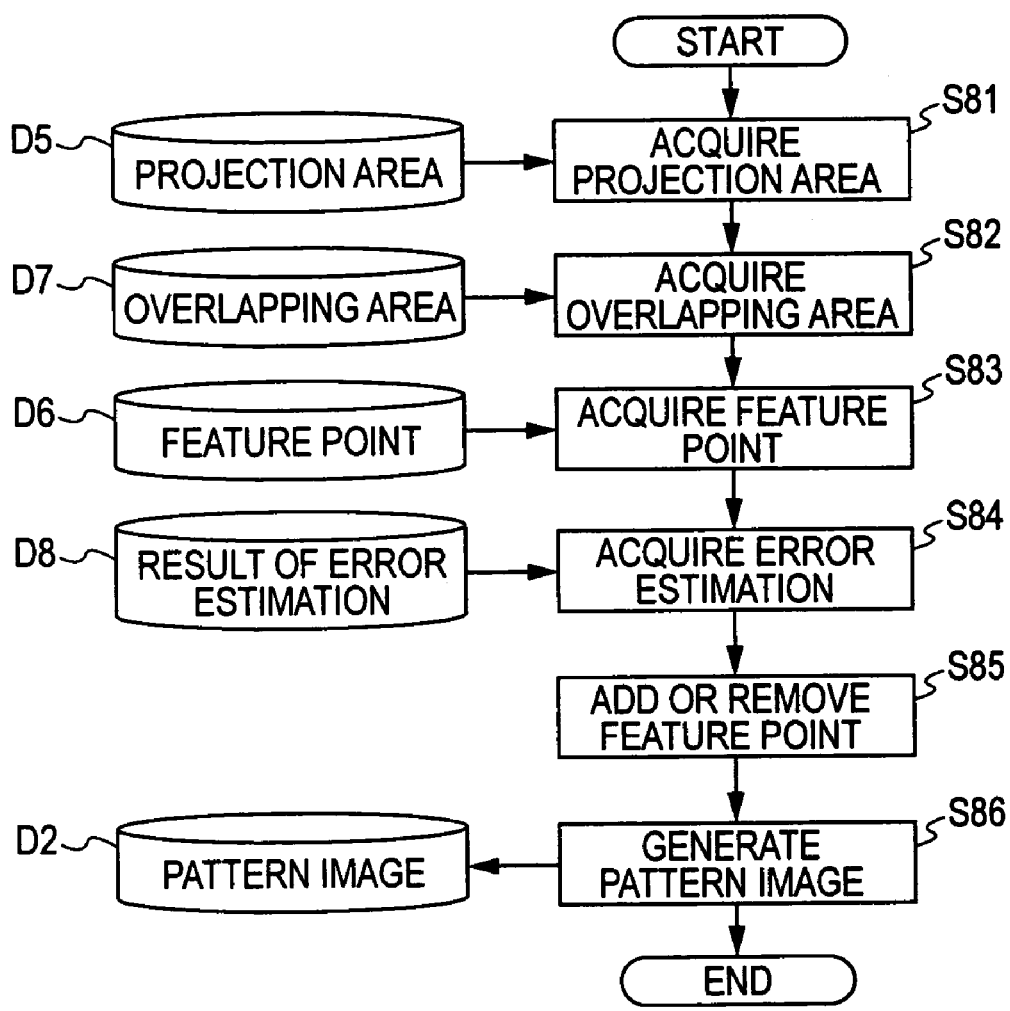
FIG. 26 is a flowchart illustrating a "pattern image updating process (second thereof)" which is performed by the pattern image generator.

FIGS. 24 and 26 are flowcharts illustrating an example of a pattern image generation process based on the error estimation result. FIG. 24 is a flowchart illustrating a pattern image generation process using 'the pattern image update process (process 1)' described above. FIG. 26 is a flowchart illustration a pattern image generation process using 'the pattern image update process (process 2)' described above.

To begin with, the sequence of the pattern image generation process using 'the pattern image update process (process 1)' will be described with reference to FIG. 24.

As data required for realizing the pattern image generation process using 'the pattern image update process (process 1), the projection region D5, the overlap region D7, the feature point D6, the error estimation result D8 calculated by the error estimating device 29 are acquired (steps S71 to S74). And then, as described in FIG. 4, it is determined whether or not the error of the error estimation result D8 is sufficiently small. If the error is not sufficiently small, the process of moving the feature point to the overlap region is performed (step S75). The pattern image D2 in which the density distribution of the feature point is updated by the movement of the feature point is generated (step S76).

The update of the density distribution of the feature point through the movement of the feature point is performed by updating the density distribution of the feature point until the error estimation result D8 has the sufficiently small value, as described in the flowchart of FIG. 4. That is, until the 'RMS' in Formula 15 has the sufficiently small value (for example, when a critical value Th is set, RMS<Th), the operation of changing the density distribution of the feature point is performed. This can be performed by using any one or a combination of Formulas 7 to 12 and by making the inequality parameter α in the used equation large.

Figure 25:
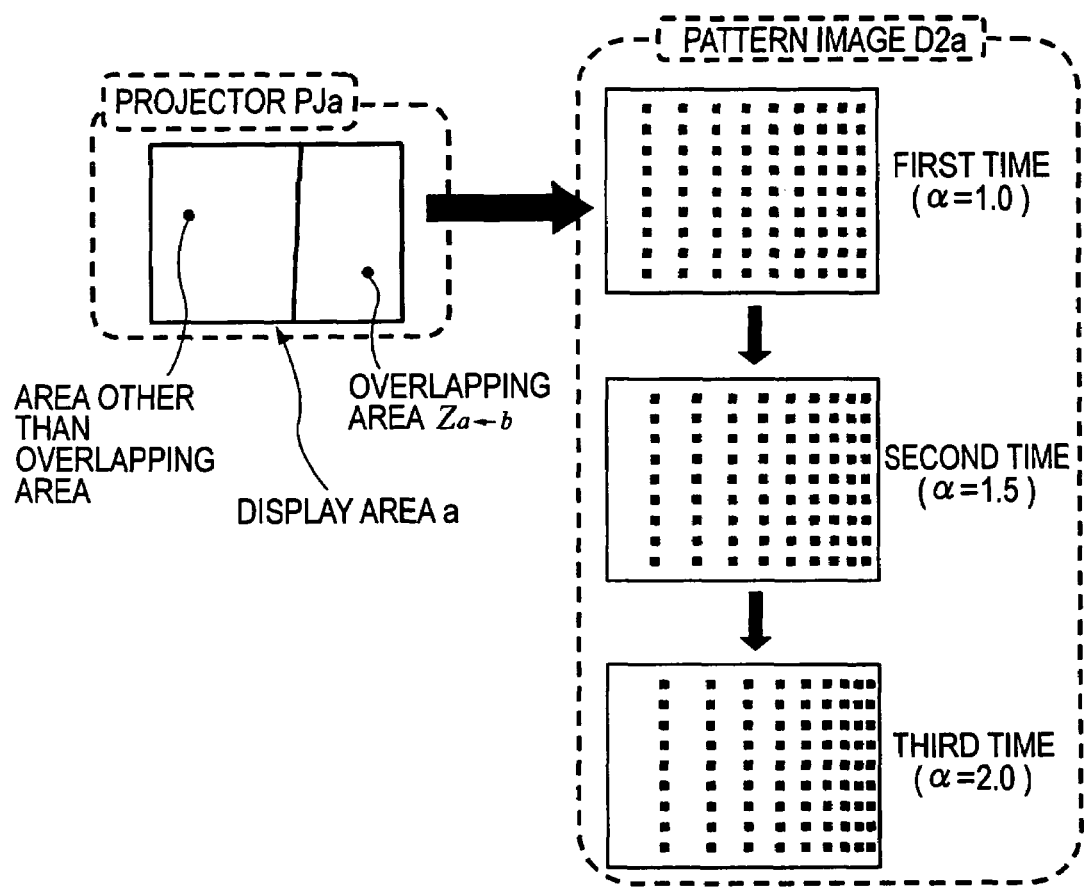
FIG. 25 is a schematic showing a "pattern image updating process (first thereof)" on the basis of a result of the error estimation.

For example, as shown in FIG. 25, by changing the inequality parameter α to have a larger value such that the inequality parameter α is 1.0 at the first time, 1.5 at the second time, and 2.0 at the third time, the density of the feature points can be sequentially increased in the overlap region $Z_{a \leftarrow b}$. In FIG. 25, the example using Formula 7 is described. Alternatively, as described above, by adapting the suitable combination of Formulas 7 to 12 and by changing the inequality parameter α in the adapted equation based on the error estimation result D8, the pattern image D2 (the pattern image D2a in the example of FIG. 25) in which the density distribution of the feature points is updated, can be generated.

FIG. 26 is a flowchart illustrating the pattern image generation process using 'the pattern image update process (process 2), that is, the pattern image generation process in which the pattern image can be updated by adding or deleting the feature point. The sequence of the pattern image generation process using 'the pattern image update process (process 2)' will be described with reference to FIG. 26.

As data required for realizing the pattern image generation process using 'the pattern image update process (process 2), the projection region D5, the overlap region D7, the feature point D6, the error estimation result D8 calculated by the error estimating device 29 are acquired (steps S81 to S84). And then, as described in FIG. 5, it is determined whether or not the error of the error estimation result D8 is sufficiently small. If the error is not sufficiently small, the process of adding or deleting the feature point is performed (step S85). The pattern image D2 in which the density distribution of the feature point is updated by the addition or deletion of the feature point is generated (step S86).

The update of the density distribution of the feature point through the addition or deletion of the feature point is performed by adding or deleting the feature point until the error estimation result D8 has the sufficiently small value, as described in the flowchart of FIG. 5. That is, until the 'RMS' in Formula 15 has the sufficiently small value (for example, when a critical value Th is set, RMS<Th), the feature point is added or deleted. A specified example in which the addition or deletion of the feature point is performed will be described with reference to FIG. 27.

Figure 27:
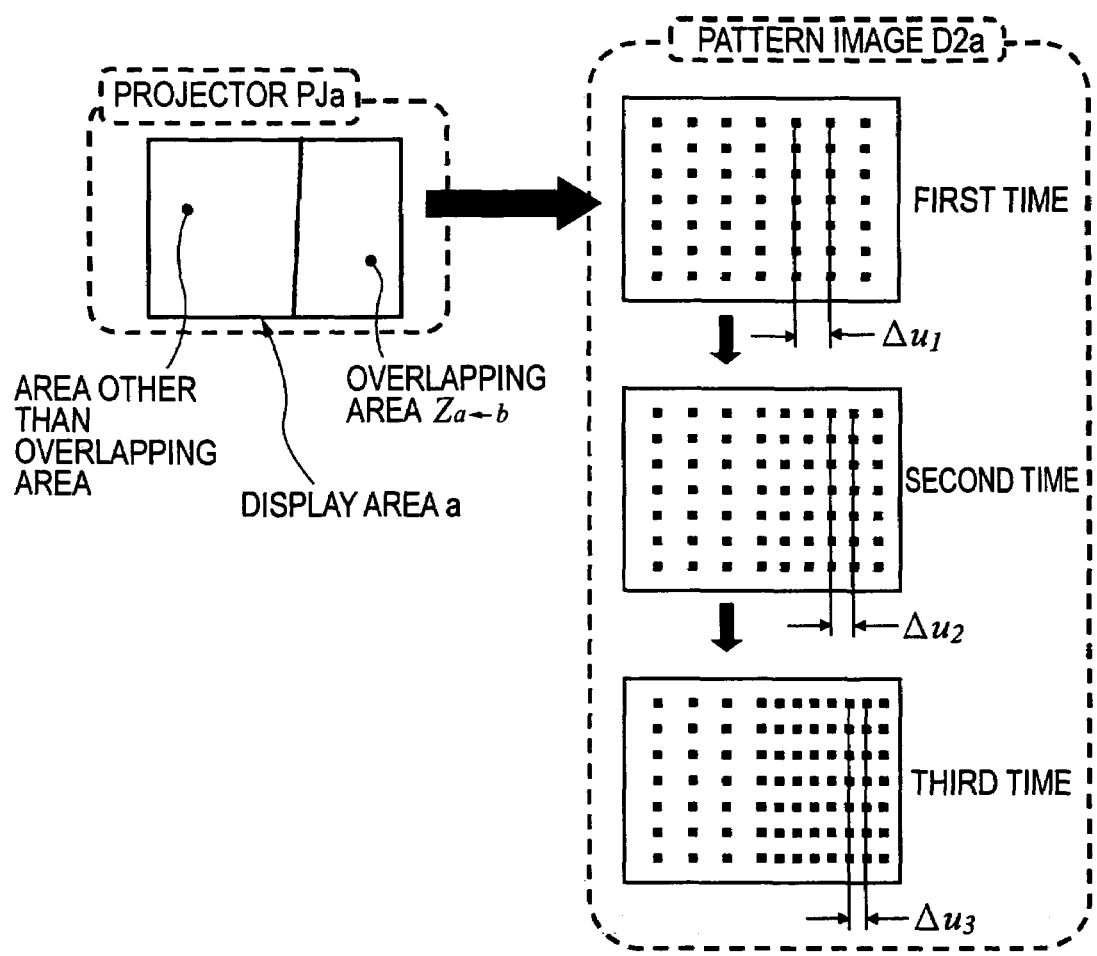
FIG. 27 is a schematic showing a "pattern image updating process (second thereof)" on the basis of a result of the error estimation.

As shown in FIG. 27, for example, by sequentially adding the vertical lines VL such that the interval Δu1 of the vertical lines VL at the first time in the overlap region $Z_{a \leftarrow b}$, the interval Δu2 of the vertical lines VL at the second time in the overlap region $Z_{a \leftarrow b}$, and the interval Δu3 of the vertical lines VL at the third time in the overlap region $Z_{a \leftarrow b}$ have a relationship of Δu1>Δu2>Δu3, the density distribution of the feature points can be sequentially increase in a specified region (in this case, the overlap region $Z_{a \leftarrow b}$). FIG. 27 shows the process of adding the vertical lines VL. According to exemplary embodiments of the present invention, however, by adding the horizontal lines HL in the same manner, the pattern image D2 (the pattern image D2a in the example of FIG. 27) in which the density distribution of the feature points is updated can be generated.

Moreover, in order to spread the interval of the vertical lines or horizontal lines, other than the specified region (the overlap region), the feature point can be deleted. This is advantageous in that the calculation amount can be reduced, as compared to the case in which the feature point is added. Further, the process of changing the density distribution of the feature points through the movement of the feature point (the change in positional coordinate) described in FIG. 25 and the process of changing the density distribution of the feature points through the addition or deletion of the feature point described in FIG. 27, can be combined.

Figure 28:
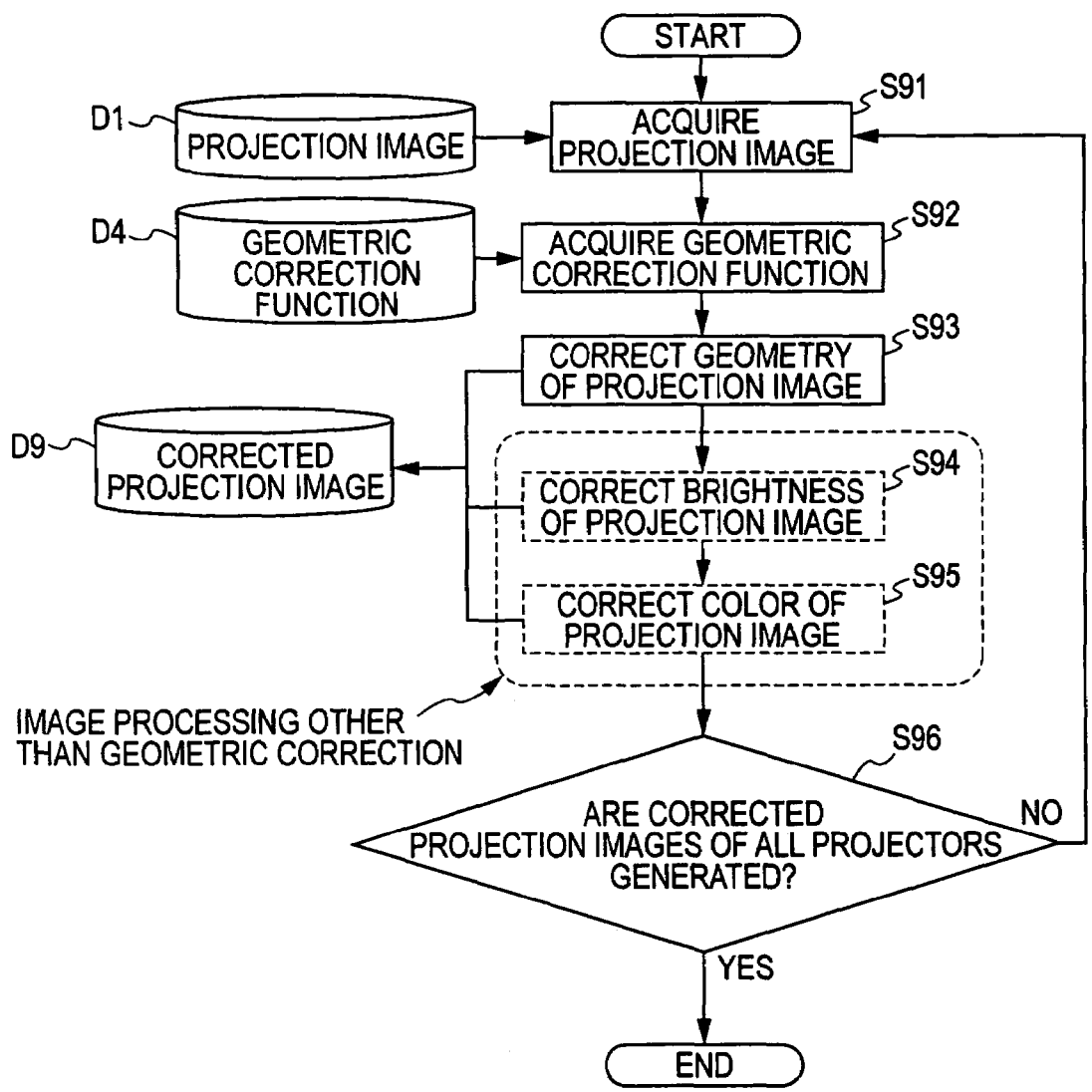
FIG. 28 is flowchart illustrating operation of an image processing unit shown in FIG. 7.

FIG. 28 is a flowchart illustrating an operation of the image processing device 27. Referring to FIG. 28, to begin with, the projection image D1 and the geometric correction function D4 are acquired respectively (steps S91 and S92). The geometric correction is performed on the projection image D1 with the geometric correction function D4 (step S93). Moreover, the geometric correction function D4 acquired by the image processing device 27 is a geometric correction function which is created by using a pattern image having a suitable density distribution of the feature points in the overlap region, and thus the geometric correction can be suitably performed in the overlap region.

And then, as an image process, other than the geometric correction, on the projection image D1, for example, brightness correction or color correction is performed (steps S94 and S95). After the image process such as the geometric correction, the brightness correction, the color correction, or the like is completed, the projection image is stored as the corrected projection image D9. And then, it is determined whether or not the corrected projection images D9 are generated for all the projectors (step S96). If the corrected projection images D9 are generated for all the projectors, then the process is ended.

Figure 29:
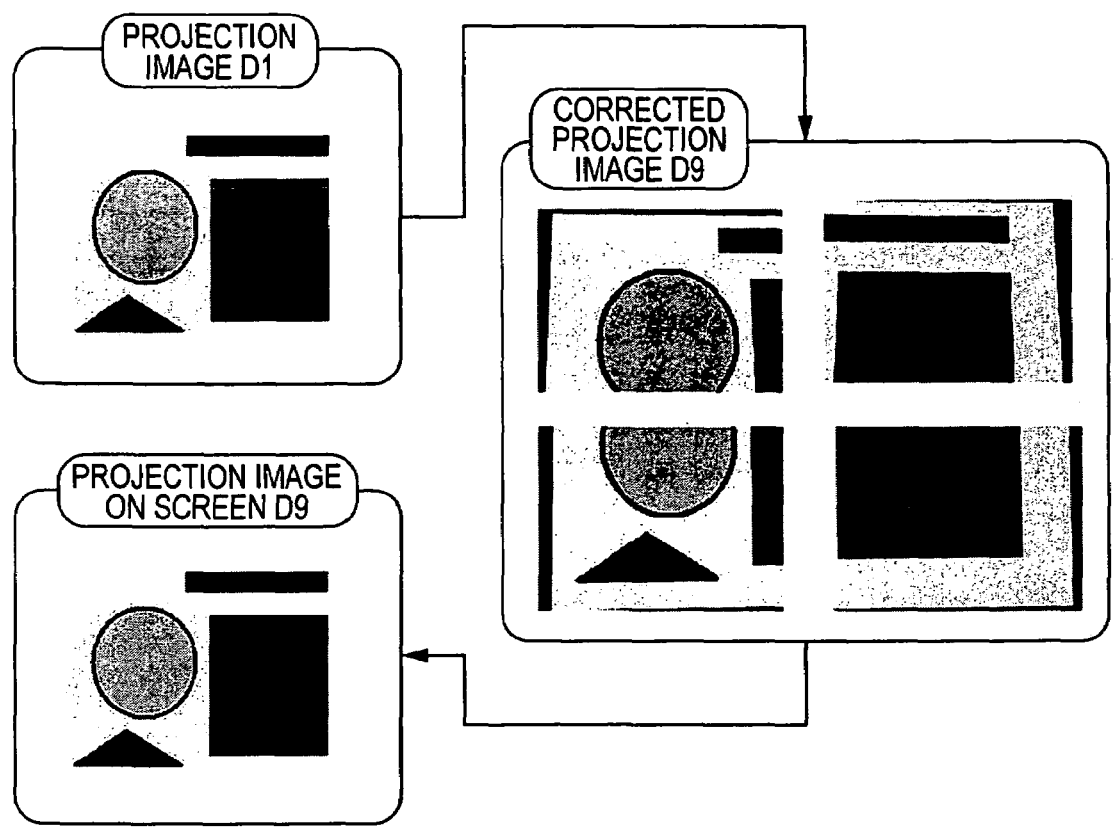
FIG. 29 is a schematic showing an example of an image process by the image processing unit shown in FIG. 7.

FIG. 29 shows an example of an image process in the image processing unit 27. Thus, the image process is performed on the projection image D1 in the same sequence as that of FIG. 28, and thus the corrected projection images are generated for all the projectors. And then, the corrected projection images for all the projectors are generated. And then, the corrected projection images are projected from the projectors respectively and adjacent projection images are tiled to overlap each other on the screen. Thus, the projection images make a large screen image consistently with no geometrical inconsistency.

Moreover, exemplary embodiments of the present invention are not limited to the above-mentioned exemplary embodiments and various exemplary modifications can be addressed or achieved without departing from the spirit of exemplary embodiments of the present invention.

For example, in the above-mentioned exemplary embodiments, it is described the example in which the overlap region where the projections regions of the plurality of projectors overlap each other is referred to as the specified region and the density distribution of the feature points in the overlap region increases. According to exemplary embodiments of the present invention, however, the specified region in which the density of the feature points increases is not limited to the overlap region. For example, the density of the feature points in a peripheral region including an edge portion of a projection region of a projector may be increased. According to this configuration, for example, even when the single projector is used or even when a multi projection system which uses a plurality of projectors with no overlap region is adapted, a suitable geometric correction in an edge portion of the projection region of the projector can be performed. Thus, a high-quality projection image can be obtained.

Further, in the above-mentioned exemplary embodiments, an example is described in which, in order to realize consistency with high precision in the overlap region, the density of the feature points in the overlap region increases and the geometric correction function for the suitable geometric correction in the overlap region is created. According to exemplary embodiments of the present invention, in addition to the exemplary embodiments, the geometric correction function may be weighted.

In this case, the residual is calculated by using geometric correspondence relationships between the positions of the plurality of features which exist in the display region on each of the plurality of projectors and the positions of the plurality of features which exist in the projection region of each of the plurality of projectors on the projection screen, and the geometric correction function. The residual is multiplied to a weighing coefficient and the geometric correction function is calculated based on the multiplication value. At that time, the weighting coefficient is set such that the value of the weighting coefficient of the overlap region where the projection region of one projector overlaps the projection region of another projector, is larger than the value of the weighting coefficient other than the overlap region, for at least one projector among the plurality of projectors.

In such a manner, in addition to the above-mentioned exemplary embodiment of the present invention (in which the density of feature points of the pattern image in the overlap region increases), the weighting coefficient in the overlap region can be set larger than that in a region other than the overlap region. Further, the geometric correction function can be created with the weighting coefficient. The created geometric correction function becomes a geometric correction function which allows the geometric correction in the overlap region with high precision. By performing the image correction with the geometric correction function in consideration of such a weighting coefficient, in the overlap region where it is difficult to realize geometrical consistency, consistency can be realized with high precision. Thus, an effect of suppressing defocus in the overlap region can be further enhanced.

Further, in addition to the above-mentioned exemplary embodiment, the projection region of each projector may be divided into a first region which is most probable that the projection region of one projector and the projection region of another projector overlap each other on the projection screen, and a second region other than the first region. Thus, the geometric correction functions corresponding to the first region and the second region can be created respectively. Moreover, the first region may be a region which is set to surround a region inferred to as the overlap region. Alternatively, the first region may be a region which is set to include a region inferred to as the overlap region. Accordingly, in the overlap region where it is difficult to realize geometrical consistency, consistency can be realized with high precision. Therefore, an effect of suppressing defocus of the overlap region can be further enhanced.

Further, the combination of all the exemplary embodiments and the modifications may be adapted. That is, the method described in the above-mentioned exemplary embodiment in which the geometric correction function is created to allow the suitable geometric correction in the overlap portion by increasing the density of the feature points of the pattern image in the overlap region, the method in which the weighting coefficient in the overlap region is set larger than that of a region other than the overlap region and the geometric correction function is created by using the weighting coefficient, and the method in which the projection region of each projector is divided into the first region which is most probable that the projection region of one projector and the projection region of another projector overlap each other on the projection screen and the second region other than the first region, and the geometric correction functions corresponding to the first region and the second region are created respectively may be combined.

Further, according to exemplary embodiments of the present invention, a processing program in which a process sequence for realizing exemplary embodiments of the present invention described above is described may be created. The processing program may be recorded in a recording medium such as a floppy disk, an optical disk, a hard disk drive, or the like. Therefore, exemplary embodiments of the present invention include a recording medium in which the processing program is recorded. Further, the processing program can be obtained through a network.

What is claimed is:

1. An image correction method for a multi-projection system, comprising:

performing a geometric association between positions, in display areas of a plurality of projectors, which are features included in pattern images projected from the plurality of projectors, and positions, in projection areas of the plurality of projectors, which are features included in pattern-photographed images obtained by photographing the pattern images projected onto a projection plane from the plurality of projectors;

forming a geometric correction on a basis of the geometric association; and correcting projection images projected from the plurality of projectors using the formed geometric correction to have geometric consistency on the projection plane, a density distribution of features of the pattern images being set such that the density of features in a specific area of the display area or projection area of each projector is higher than that in an area except for the specific area in at least one of the plurality of projectors.

2. The image correction method for a multi-projection system according to claim 1, further comprising:

expressing the density of features by a number of features per unit area in the specific area.

3. The image correction method for a multi-projection system according to claim 1, the specific area being an overlapping area where the projection area of each projector overlaps the projection areas of other projectors.

4. The image correction method for a multi-projection system according to claim 1, the specific area being a boundary area including an edge portion for each projector.

5. The image correction method for a multi-projection system according to claim 3, further comprising:

setting higher, with respect to one projector among the plurality of projectors, the density of features in the overlapping area as a number of overlapping areas, where the projection areas of other projectors overlap the projection area of the one projector, is increased.

6. The image correction method for a multi-projection system according to claim 1, further comprising:

estimating the geometric correction function formed on the basis of the geometric association by performing the geometric association between positions, in the display areas of the plurality of projectors, which are features included in the pattern images projected from the plurality of projectors, and positions, in the projection areas of the plurality of projectors, which are features included in the pattern-photographed images obtained by photographing the pattern images projected onto the projection plane from the plurality of projectors;

updating the pattern images by varying the density distribution of features when it is determined that the result of the estimation is not reasonable; and forming the geometric correction function on the basis of the updated pattern images.

7. The image correction method for a multi-projection system according to claim 6, further comprising:

varying the density distribution of the features by further increasing the density of features in each specific area by changing the positions of the features included in the pattern images.

8. The image correction method for a multi-projection system according to claim 6, further comprising:

varying the density distribution of the features by further increasing the density of features in each specific area by adding or removing the features included in the pattern images.

9. The image correction method for a multi-projection system according to claim 6, further comprising:

varying the density distribution of the features in the display areas of the projectors or the projection areas of the projectors on the projection plane.

10. The image correction method for a multi-projection system according to claim 1, further comprising:

forming the geometric correction function on a basis of a sum of residuals calculated using the geometric association and the geometric correction function between the positions, in the display areas of the plurality of projectors, of features included in the pattern images, and the positions, in the projection areas of the plurality of projectors, of features included in the projection areas on the projection plane of the plurality of projectors, when the pattern images are projected onto the projection plane.

11. The image correction method for a multi-projection system according to claim 1, further comprising:

providing the features included in the pattern images such that images having the features are interspersed at points, edges, and corners on the display areas of the projectors.

12. An image correcting device for a multi-projection system in which geometric association is performed between positions, in display areas of a plurality of projectors, which are features included in pattern images projected from the plurality of projectors, and positions, in projection areas of the plurality of projectors, which are features included in pattern-photographed images obtained by photographing the pattern images projected onto a projection plane from the plurality of projectors, a geometric correction function being formed on a basis of the geometric association, and projection images projected from the plurality of projectors are corrected using the formed geometric correction function to have geometric consistency on the projection plane, the image correcting device, comprising:

a pattern image generating device to set a density distribution of features of the pattern images such that the density of the features in a specific area of the display area or projection area of each projector is higher than that in an area other than the specific area in at least one of the plurality of projectors.

13. A multi-projection system, comprising:

an image correcting device according to claim 12, capable of correcting projection images from a plurality of projectors so as to have geometric consistency on a projection plane when the projection images projected from the plurality of projectors are displayed such that parts of the projection images are overlapped with each other.

* * * * *